US011809829B2

(12) United States Patent
Miller et al.

(10) Patent No.: US 11,809,829 B2
(45) Date of Patent: *Nov. 7, 2023

(54) VIRTUAL ASSISTANT FOR GENERATING PERSONALIZED RESPONSES WITHIN A COMMUNICATION SESSION

(71) Applicant: MICROSOFT TECHNOLOGY LICENSING, LLC, Redmond, WA (US)

(72) Inventors: Adi Miller, Herzilya (IL); Shira Weinberg, Herzliya (IL); Haim Somech, Herzliya (IL); Hen Fitoussi, Ramat HaSharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/811,868

(22) Filed: Mar. 6, 2020

(65) Prior Publication Data

US 2020/0394366 A1     Dec. 17, 2020

Related U.S. Application Data

(63) Continuation of application No. 15/637,831, filed on Jun. 29, 2017, now Pat. No. 10,585,991.

(51) Int. Cl.
*G10L 25/00* (2013.01)
*G10L 21/00* (2013.01)
(Continued)

(52) U.S. Cl.
CPC ............ *G06F 40/35* (2020.01); *G06Q 10/04* (2013.01); *G06Q 10/06* (2013.01); *G06Q 50/01* (2013.01);
(Continued)

(58) Field of Classification Search
CPC ............ G06F 16/3344; G06F 16/3329; G06F 17/2785; G06F 11/301; G06F 16/2455;
(Continued)

(56) References Cited

U.S. PATENT DOCUMENTS 6,907,571 B2   6/2005   Slotznick
7,886,012 B2   2/2011   Bedi et al.
(Continued)

FOREIGN PATENT DOCUMENTS

CN     106503156 A     3/2017
CN     106575503 A     4/2017

OTHER PUBLICATIONS

"Office Action Issued in Indian Patent Application No. 202047003490", dated Mar. 2, 2022, 7 Pages.
(Continued)

*Primary Examiner* — Michael Ortiz-Sanchez
(74) *Attorney, Agent, or Firm* — SHOOK, HARDY & BACON L.L.P.

(57) ABSTRACT

Intelligent agents (IA) for automatically generating responses to content within a communication session (CS) are disclosed. An IA is trained to target the responses to a user and the user's context within the CS. An IA receives CS content that includes natural language expressions encoding users' conversations and determines content features based on natural language models. The content features indicate intended semantics of the expressions. The IA identifies likely-relevant content to the targeted user, to generate a response for. Identifying such content includes determining a relevance of the content based on content features, a context of the CS, a user-interest model, and a content-relevance model. Identifying the likely-relevant content to respond to is based on the determined relevance of the content and relevance thresholds. Various responses to the
(Continued)

identified portions of the content are automatically generated and provided based on a natural language response-generation model targeted to the user.

20 Claims, 6 Drawing Sheets

(51) Int. Cl.
| | |
|---|---|
| G06F 40/35 | (2020.01) |
| G06Q 10/06 | (2023.01) |
| G06Q 50/00 | (2012.01) |
| G06Q 10/04 | (2023.01) |
| G10L 15/183 | (2013.01) |
| G10L 15/22 | (2006.01) |
| G10L 15/26 | (2006.01) |
| G10L 15/00 | (2013.01) |

(52) U.S. Cl.
CPC ............ *G10L 15/183* (2013.01); *G10L 15/22* (2013.01); *G10L 15/26* (2013.01); *G06F 2203/0381* (2013.01); *G10L 15/00* (2013.01)

(58) Field of Classification Search
CPC ............ G06F 16/2457; G06F 17/2881; G06F 2009/45587; G06F 21/566; G06F 40/30; G06F 40/35; G06F 40/20; G06F 40/10; G06F 2203/0381; G06F 40/00; G06F 40/279; H04M 3/5175; H04M 3/51; H04M 3/523; G10L 15/22; G10L 15/00; G10L 15/26; G10L 2015/225; G10L 15/18; G10L 15/183; G10L 15/1822; G10L 2015/228; G10L 2015/226; G06N 3/006; G06Q 30/016; G06Q 10/10; G06Q 10/02; G06Q 30/02; G06Q 30/0251; G06Q 50/01; G06Q 10/04; G06Q 10/06; G06Q 30/0281

See application file for complete search history.

(56) References Cited

U.S. PATENT DOCUMENTS

| | | | |
|---|---|---|---|
| 8,095,613 | B1 | 1/2012 | Perkowitz et al. |
| 8,316,315 | B2 | 11/2012 | Portnoy et al. |
| 8,626,832 | B2 | 1/2014 | Jerrard-dunne et al. |
| 8,719,200 | B2 | 5/2014 | Beilby et al. |
| 9,009,256 | B1 | 4/2015 | Demorrow et al. |
| 9,043,197 | B1 | 5/2015 | Pasca et al. |
| 9,116,984 | B2 | 8/2015 | Caldwell et al. |
| 9,177,318 | B2 | 11/2015 | Shen et al. |
| 9,318,108 | B2 | 4/2016 | Gruber et al. |
| 9,369,410 | B2 | 6/2016 | Westwood et al. |
| 9,374,327 | B2 | 6/2016 | Rao Dv |
| 9,430,738 | B1 | 8/2016 | Hui et al. |
| 10,585,991 | B2 | 3/2020 | Miller et al. |
| 10,931,611 | B2 | 2/2021 | Dotan-cohen et al. |
| 2004/0143636 | A1 | 7/2004 | Horvitz et al. |
| 2004/0236719 | A1 | 11/2004 | Horvitz |
| 2006/0080161 | A1 | 4/2006 | Arnett et al. |
| 2006/0111894 | A1 | 5/2006 | Sammarco et al. |
| 2008/0275849 | A1 | 11/2008 | Basu et al. |
| 2008/0300872 | A1 | 12/2008 | Basu et al. |
| 2008/0311935 | A1 | 12/2008 | Tysowski |
| 2009/0055481 | A1 | 2/2009 | Carmel et al. |
| 2010/0180001 | A1 | 7/2010 | Hardt |
| 2010/0318620 | A1 | 12/2010 | Bansal et al. |
| 2010/0332218 | A1 | 12/2010 | Liu et al. |
| 2011/0060591 | A1 | 3/2011 | Chanvez et al. |
| 2012/0173624 | A1 | 7/2012 | Beerse et al. |
| 2013/0006973 | A1 | 1/2013 | Caldwell et al. |
| 2013/0124189 | A1* | 5/2013 | Baldwin ............ G10L 15/1815 704/9 |
| 2013/0124191 | A1 | 5/2013 | Louis et al. |
| 2013/0144616 | A1* | 6/2013 | Bangalore ............ G10L 15/197 704/226 |
| 2013/0218987 | A1 | 8/2013 | Chudge et al. |
| 2013/0246524 | A1 | 9/2013 | Berner et al. |
| 2013/0253910 | A1 | 9/2013 | Turner et al. |
| 2014/0143405 | A1 | 5/2014 | Pavlidis et al. |
| 2014/0188862 | A1* | 7/2014 | Campbell ......... G06F 16/24575 707/728 |
| 2014/0189022 | A1 | 7/2014 | Strumwasser et al. |
| 2014/0337370 | A1* | 11/2014 | Aravamudan ........ G06F 16/245 707/759 |
| 2015/0120680 | A1 | 4/2015 | Omar et al. |
| 2015/0244687 | A1 | 8/2015 | Perez et al. |
| 2016/0142359 | A1 | 5/2016 | Lock et al. |
| 2016/0170971 | A1 | 6/2016 | Mcsherry et al. |
| 2016/0173428 | A1 | 6/2016 | Balasubramanian et al. |
| 2016/0342285 | A1 | 11/2016 | Wang |
| 2016/0344673 | A1 | 11/2016 | Abou Mahmoud et al. |
| 2017/0092264 | A1* | 3/2017 | Hakkani-Tur ......... G06N 3/084 |
| 2017/0126594 | A1 | 5/2017 | Chudge et al. |
| 2017/0142036 | A1 | 5/2017 | Li et al. |
| 2017/0142046 | A1 | 5/2017 | Abou Mahmoud et al. |
| 2017/0293834 | A1 | 10/2017 | Raison et al. |
| 2017/0359393 | A1* | 12/2017 | Rajagopal ........... H04L 65/1069 |
| 2018/0067991 | A1* | 3/2018 | Agarwal ............. G06F 16/2455 |
| 2018/0108347 | A1 | 4/2018 | Ogata et al. |
| 2018/0218734 | A1 | 8/2018 | Somech et al. |
| 2018/0300400 | A1 | 10/2018 | Paulus |
| 2018/0322380 | A1* | 11/2018 | Aggarwal .............. G06N 3/006 |
| 2019/0005021 | A1 | 1/2019 | Miller et al. |
| 2019/0005023 | A1 | 1/2019 | Olsen et al. |
| 2019/0005024 | A1 | 1/2019 | Somech et al. |

OTHER PUBLICATIONS

"Notice of Allowance Issued in U.S. Appl. No. 15/636,346", dated Feb. 28, 2023, 9 Pages.
"First Office Action and Search Report Issued in Chinese Patent Application No. 201880043460.9", dated Feb. 25, 2023, 9 Pages.
Paulus, Romain, "Your TLDR by an ai: a Deep Reinforced Model for Abstractive Summarization", In Salesforce, May 11, 2017, 13 Pages.
"First Office Action and Search Report Issued in Chinese Patent Application No. 201880043463.2", dated Mar. 24, 2023, 11 Pages.
"Deep Learning for Chatbots, Part 1—Introduction", Retrieved from: https://web.archive.org/web/20160407050941/http://www.wildml.com/2016/04/deep-learning-for-chatbots-part-1-introduction/, Apr. 6, 2016, 8 Pages.
"Final Office Action Issued in U.S. Appl. No. 15/636,346", dated Aug. 29, 2019, 24 Pages.
"Final Office Action Issued in U.S. Appl. No. 15/636,346", dated Nov. 18, 2022, 7 Pages.
"Non Final Office Action Issued in U.S. Appl. No. 15/636,346", dated Dec. 31, 2019, 24 Pages.
"Non Final Office Action Issued in U.S. Appl. No. 15/636,346", dated Aug. 3, 2022, 24 Pages.
"Non-Final Office Action Issued in U.S. Appl. No. 15/636,346", dated Jan. 8, 2019, 24 Pages.
"Office Action Issued in European Patent Application No. 18734662.2", dated May 16, 2022, 6 Pages.
"Office Action Issued in European Patent Application No. 18734662.2", dated Mar. 11, 2021, 7 Pages.
"Office Action Issued in Indian Patent Application No. 201947053914", dated Feb. 26, 2022, 6 Pages.
Kerly, et al., "The Potential for Chatbots in Negotiated Learner Modelling: A Wizard-of-oz Study", In Proceedings of the 8th international conference on Intelligent Tutoring Systems, Jun. 26, 2006, 10 Pages.
Lunden, Ingrid, "Zendesk's "Automatic Answers" Taps Machine Learning, AI to Generate Bot-Style email Responses", Retrieved from: https://techcrunch.com/2016/07/13/zendesks-automatic-answers-taps-machine-learning-ai-to-generate-bot-style-email-responses/, Jul. 13, 2016, 6 Pages.
"International Search Report and Written Opinion Issued in PCT

(56) References Cited

OTHER PUBLICATIONS

Application No. PCT/US2018/034263", dated Aug. 20, 2018, 13 Pages.
"Notice of Allowance Issued in Chinese Patent Application No. 201880043460.9", dated Aug. 14, 2023, 5 Pages.
"Second Office Action Issued in Chinese Patent Application No. 201880043463.2", dated Aug. 18, 2023, 7 Pages.

* cited by examiner

VIRTUAL ASSISTANT FOR GENERATING PERSONALIZED RESPONSES WITHIN A COMMUNICATION SESSION

CROSS-REFERENCE TO RELATED APPLICATION

The present application is a continuation of U.S. application Ser. No. 15/637,831, filed Jun. 29, 2017, and titled "VIRTUAL ASSISTANT FOR GENERATING PERSONALIZED RESPONSES WITHIN A COMMUNICATION SESSION" which is incorporated herein by reference in its entirety.

BACKGROUND

People frequently find themselves multitasking between numerous chores distributed across multiple computing interfaces, applications, platforms, displays, and devices. For instance, due to the ever-increasing ubiquity of networked computing, users may now simultaneously participate in one or more communication sessions, such as chat or instant messaging (IM) sessions, while also shopping online, generating an employment-related document, scheduling vehicle maintenance, or other numerous tasks.

Active participation in a communication session often requires reading (or otherwise consuming), processing, and responding to the conversation within the communication session. Thus, even though computing devices have enabled users to simultaneously attend to separate and disparate tasks, users may still experience difficulty in the real-time performance of various functions associated with each. For example, it may be challenging for a user to actively monitor, track, and appear responsive to the conversation, while simultaneously comparing products on an e-commerce website, drafting a work-related memorandum, or consulting a calendar for availability to deliver their vehicle to a service station.

Because active participation in a communication session is challenging when the user's attention is diverted to other tasks, the user may risk the loss of opportunity to respond at critical junctures in the conversation. Accordingly, a user attempting to multitask may appear to other users as unresponsive and/or disengaged. Furthermore, the user may lose opportunities to provide their unique perspective to the conversation. More succinctly, the utility and user-experience of a real-time communication session may be degraded when the user attempts to distribute their attention across multiple tasks.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards providing enhanced services to a user participating in one or more communication sessions (CSs). In some embodiments, a portion of such CS services may be provided via an enhanced virtual assistant (VA), an enhanced intelligent agent (IA), an enhanced "chat-bot" or as part of a computer program or service for facilitating communication. The enhanced services may include analyzing a CS, identifying likely-relevant content of the CS, generating a response to the likely-relevant content, and providing the response to the identified likely-relevant content. The various enhanced services may be enabled by one or more methods. One such method may be implemented by receiving content that is exchanged in the CS. The content includes natural language expressions or utterances that encode a conversation carried out by a plurality of users participating in the CS. The method may be implemented by determining content features of the content based on the content and natural language models. The content features indicate intended semantics of the natural language expressions. The method may further be implemented by determining a relevance of the content and identifying portions of the content that are likely-relevant to the user. Determining the relevance of the content may be based on the content features, a user-interest model for the user, the context of the user and a content-relevance model for the user. Identifying the likely-relevant content is based on the relevance of the content and various relevance thresholds. A response to the identified likely-relevant portions of the content may be generated based on response-generation model. The response may be provided to the user and/or the CS.

In various embodiments, the method may further include monitoring user activity of the user and identifying and/or inferring user-activity patterns based on the monitored user activity. Additionally, user-activity-patterns may be inferred from other data sources, such as the user's history includes user profile information. The user-interest and/or the content-relevance models may be generated, updated, and/or trained based on the inferred user-activity patterns. The method may also include monitoring various CSs that the user participates in and identifying and/or inferring patterns within the content of the monitored CSs. For instance, various patterns of content-substance and content-style features within the content that the user provides may be inferred. The content-substance model, the content-style model, and the response-general model may be generated, updated, and/or trained based on the inferred content-substance and content-style patterns. The method may include various features of the current user context outside of the CS, as user is out of routine, as additional input for computing the relevance level.

The method may further include receiving additional data associated with the CS, such as but not limited to metadata associated with the CS. Contextual features of the CS may be determined based on the received additional data and a CS context model. The contextual features may indicate a context of the conversations. In some embodiments, the contextual features indicate a context of the CS for the particular user. The relevance of the content may be determined further based on the contextual features of the CS. Generating the response to the likely-relevant portions of the content may further be based on the contextual features of the CS.

The method may be further implemented by identifying a sub-portion of the likely-relevant portions of the content that are highly-relevant to the user. Identifying the highly-relevant portions of the content may be based on the relevance of the content and an additional relevance threshold. The additional relevance threshold may be greater than the relevance thresholds employed to identify the likely-relevant portions of the content. For instance, the additional threshold may be a highly-relevant threshold or an urgency threshold. A response to the highly-relevant content may be generated based on the response-generation model. A real-time, or near real-time, notification of the highly-relevant content and the response to the highly-relevant content may be provided to the first user.

In one embodiment, the method is implemented by determining content-substance features and content-style features. The content-substance features and the content-style features are based on content-substance and content-style models included in the natural language models. The content-substance features may indicate topics discussed in the conversation. The content-style features may include features other than substantive features of the content. For instance, content-style features may indicate an emotion, sentiment, intonation, volume, cadence, pitch, or other style-related features, or a variance or change in one or more of the style-related features of one or more of the users participating in the CS. The determined relevance of the content may be further based on the content-substance features and the content-style features. Generating the response to the likely-relevant content may be further based on the content-substance features and the content-style features of the likely-relevant content.

The method may further be implemented by generating summarized versions of at least some of the likely-relevant portions of the content. The summarized versions may be generated using one or more natural language models. Generating the response to the likely-relevant content may be further based on the summarized versions of the likely-relevant portions of the content. The method may provide the summarized versions of the likely-relevant content to the user.

The method may further include determine content-substance features to encode in the response. Determining the content-substance features to encode in the response may be based on other content-substance features and/or content-style features encoded in the likely-relevant portions of the content. In some embodiments, the response-generation model and/or the content-substance model are employed to determine the content-substance features to encode in the response. Content-style features to encode in the response may be determined. Determining the content-style features to encode in the response may be based on other content-substance features and/or content-style features encoded in the likely-relevant portions of the content. In some embodiments, the response-generation model and/or the content-style model are employed to determine the content-substance features to encode in the response. When the method is operated in a semi-autonomous mode, the response to the likely-relevant portions of the content is provided first to the user. When the method is operated in an autonomous mode, the response to the likely-relevant portions of the content is provided to the CS.

In various embodiments, the user may provide feedback to the system regarding the accuracy and/or utility of the response. This feedback may be employed by the various embodiments to further train and/or update the various models, such as but not limited to the content-relevance model, the user-interest model, user context model, the content-substance mode, the content-style mode, or the response-generation model. For instance, the user may be provided a user-interface (UI) that enables the user to provide feedback on the automatically generated response. Such a UI may include one or more buttons, sliders, levers, scales, or the like that enable the user to rate and/or annotate the response. For example, the user may rate the response in terms of "4 out of 5" stars, or some other scale. The rating scale may be a binary scale, such as a "thumbs-up" or "thumbs-down" scale. The user may annotate and/or correct the response. In one embodiment, a prompt may be provided to the user for each section of the response, wherein the user can indicate a utility of each section. The prompt may individually highlight each section of the response, as the user is reviewing and rating the section. The various models may then be refined and/or updated based on training that employs such feedback.

In other embodiments, user feedback may be provided via other mechanism. For instance, the method may include receiving at least one other response to the likely-relevant portions. The other response may be a manually curated or edited version of the automatically generated response. In another embodiment, the other response may be manually generated by the user. The other response may be employed as user feedback for training purposes. A comparison of the response and the other response may be generated. The models, including the content-relevance model and the response-generation model, may be updated based on the comparison of the response and the other response. That is, the other response of the CS may be employed as a "ground-truth" or "baseline" response for the training of the content-relevance model and response-generation model. In this way, embodiments of the disclosure provide an enhanced utility and user experience of participating in one or more CS.

BRIEF DESCRIPTION OF THE DRAWINGS

Aspects of the disclosure are described in detail below with reference to the attached drawing figures, wherein.

DETAILED DESCRIPTION

Figure 1:
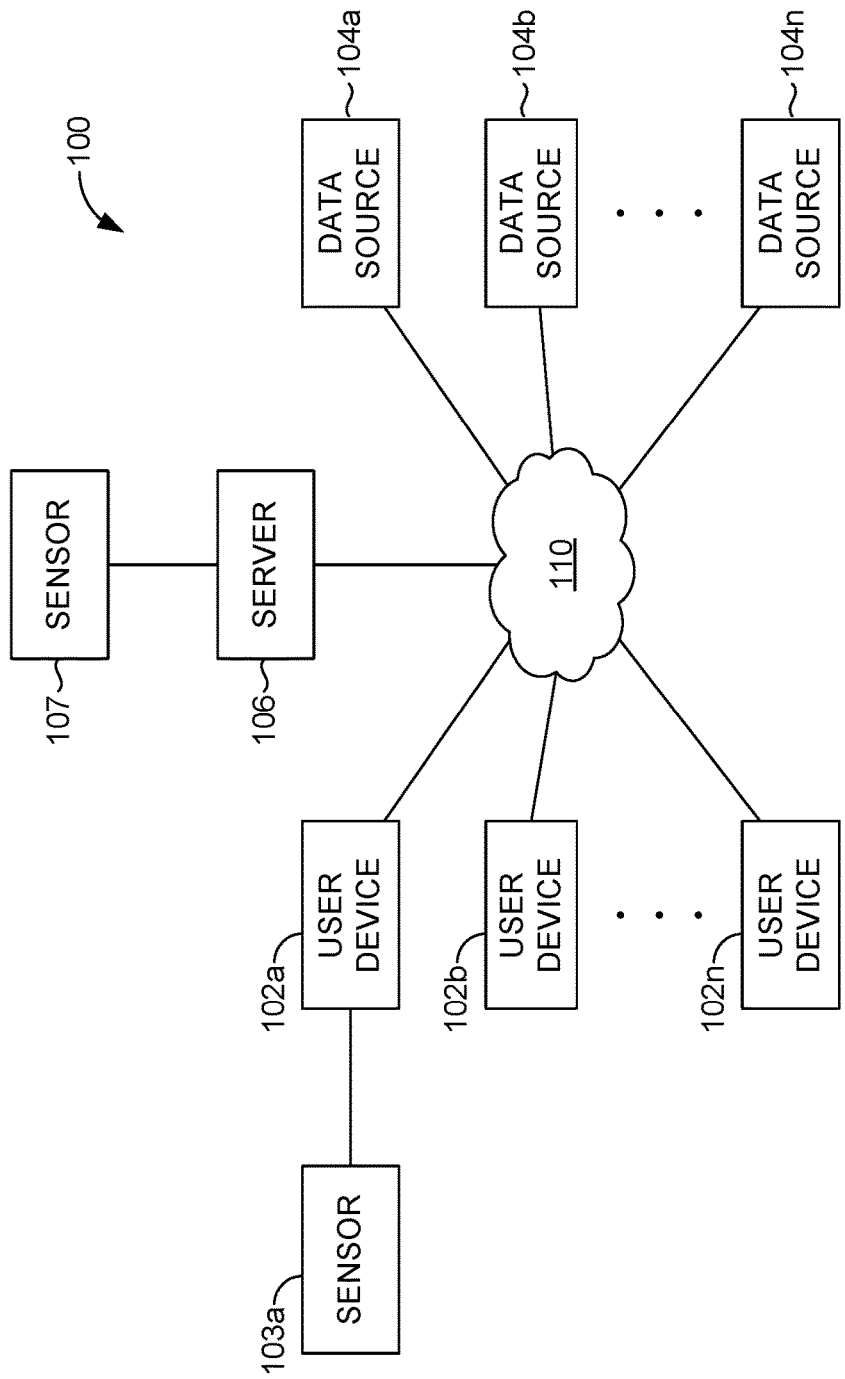
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to providing various enhanced services to a user participating in one or more communication sessions (CSs). As discussed throughout, the provided services may enhance the utility and user-experience for the user participating in the one or more CSs. In particular, embodiments herein actively monitor and analyze the content and context of the one or more CSs, via various natural language processing (NLP) and other machine-learning (ML) methodologies. Based on the analysis of the content and context of the CS, the embodiments automatically generate responses that the user is likely to manually provide within the ongoing conversation occurring in the CS. NLP and other ML methodologies are used to generate the user's likely response. That is, the embodiments employ ML methodologies to "learn" the likely responses a user would otherwise manually provide in a conversation, based on the content and context of the conversation. Thus, the embodiments provide an intelligent agent (AI) customized to the user, wherein the IA automatically provides input content (i.e., responses) that may contribute to ongoing conversations occurring within one or more CSs. The automatic generation of likely responses frees up the user's attention to attend to other activities. Thus, the user may appear to be attentive in an ongoing conversation, while the user is simultaneously attending to other tasks.

Various data models, such as but not limited to machine learning (ML) data models, are employed to monitor and analyze, in real-time or near real-time, data associated with the CS, including the content, metadata of the CS, and other data associated with the CS. That is, data models are employed to determine a context of the CS, as well as a relevance of various portions of the content based on the determined context and features encoded in the content. Portions of the content that are likely to be relevant to the user, based on the user's activities and interests, are identified. The context of the identified relevant portions of the content may also be determined. Based on the determined context, as well as the substance and style of the relevant portions, the various embodiments generate additional content (i.e., responses) for the CS, where the substance and style of the responses are targeted to the user and the context of the CS, with respect to the user. That is, the embodiments automatically generate responses for the CS, wherein the generated responses are targeted to the user and the user's context within the CS.

More specifically, the embodiments generate a logical response based on the analyzed content and content-substance data models. A logical response may include the semantics or substance of the response. For instance, if the response includes an answer to a question posed to the user in the likely-relevant content, the logical response may include the answer to the question. The logical response is updated to generate a stylized response that is targeted to the conversational style of the user based on content-style data models. The stylized response is a personalized response that includes both the substance of the response, as well as stylistic features that simulate the user's conversational style. In the above example, the stylistic response may include the answer to the question, but phrased in a way that simulates or mimics the user's conversational style when answering a question.

The embodiments may be operated in a "semi-autonomous mode," wherein the stylized response and/or the logical response is provided to the user, such that the user may manually edit and/or update the stylized and/or logical response, prior to providing the response to the CS. Alternatively, the embodiments may be operated in an "autonomous mode," wherein the stylized response is automatically provided to the CS without the user's intervention.

In either operating mode, an indicator or notification may be provided to the CS, along with the response, wherein the indicator or notification indicates to other users participating in the CS that at least a portion of the response was automatically generated via an IA. In other embodiments, no such indicator is provided, and thus because the stylized response simulates the conversation style of the user, the other users would not realize that the response was automatically generated via an IA on behalf of the user. Thus, the embodiments provide an IA that is enabled to autonomously or semi-autonomously participate in conversations, via one or more CSs, on behalf of the user. Furthermore, the IA may operate covertly such that the other users participating in the conversations may not realize that an IA is participating in the conversations on behalf of the user. Thus, the embodiments may automatically generate and/or provide content for one or more CSs, wherein the automatically generated content is equivalent to, or similar, in both style and substance to the content that the user would otherwise likely manually provide.

As noted above, the IA may autonomously, or semi-autonomously, act on behalf of the user via the generation and providing of content that would otherwise likely be provided by the user. Thus, the user's manual burden associated with participating in one or more CSs is significantly diminished, and the user's attention may be diverted to other tasks. In addition, because the generation of responses to likely-relevant content is automated, the embodiments enable a user to simultaneously participate in multiple CSs, such that the other users participating in any given CS may not realize that the user's attention is at least momentarily diverted to other tasks, such as consuming and providing responses to other CSs.

The automatically generated responses may be provided to the CS or the user in a textual or audible format. In some embodiments, the text of the responses is provided in a window hosting the CS. In other embodiments, the text of the responses is provided in another window such that the user may edit and copy and paste the text into the window hosting the CS. In some embodiments, text-to-audio services are employed to automatically generate a spoken version of the response. In some embodiments, ML methodologies are employed to automatically generate spoken versions of the responses that emulate the voice of the user. That is, audible versions of the response may be generated that sound similar to as if the user spoke the responses. When operated in an autonomous mode, such audible versions of the responses may be provided directly to the CS, such that the other users participating in the CS may be under the impression that the user spoke such an automatically generated response.

As discussed throughout, various ML methodologies may be employed to analyze the content and context of the CS, as well as determining the relevance of the content and automatically generating the logical and stylized responses for the user. More particularly, ML methodologies are employed to generate and/or train various ML data models to determine each of the substance and style of the content, as well as the relevancy to one or more particular users. Additionally, user targeted ML data models are generated and/or trained to identify relevant content for the user and generate the logical and stylized responses for the user. That is, each of the data model discussed herein may be customized to a particular user.

Because the data models are customized to each user, the identification of relevant content and the generation of logical and stylized responses is targeted to each specific user. That is, data models, such as but not limited to a user-interest, content-relevance, content-substance, and content-style data models may be generated for the specific user. The user-interest and content-relevance models may be trained based on monitored user activity and inferred user-activity patterns, as well as user profile information for the specific user. The content-substance and content-style models may be trained based on monitor the content that the user generates and provides to various CS, as well as the content generated by other users participating in a CS.

The user-interest and content-relevance models, as well as the context of the CS, may be employed to determine the relevancy of the content, specific to the user and the context of the CS. The content-substance model may be employed to generate a logical response in response to content that determined as relevant to the user. The content-style model is employed to update the logical response and/or generate a stylized response. In one embodiment, the various embodiments provide real-time notifications to the user indicating content that likely-relevant to the user and the generated logical and stylized responses to the likely-relevant content. That is, when content that is identified as likely-relevant, embodiments may provide real-time audible and/or visual indications of the likely-relevant content, as well as the automatically generated logical and stylized responses.

Analyzing the content of a CS and generating logical and stylized responses to likely-relevant content may include employing various ML methodologies, such as trained NLP models to determine and/or identify various content features of the content, such as but not limited content-substance and content-style features. The content-substance features indicate the semantics or meanings of the natural language utterances and/or expressions embedded in the conversations carried out via the CS. That is, the content-substance features may indicate topics being conversed about, as well as the intentioned semantic meaning and context of the speaker's expressions. In contrast, the content-style features indicate various stylistic characteristics of the natural language utterances and/or expressions embedded in the conversations. That is, the content-style features indicate the speaking styles of the speakers.

Analyzing the context of the CS may include determining various contextual features via ML methodologies, statistical analyses, and other data analysis techniques. The context features indicate the context of the conversation carried out via the CS. Context features may be specific to the user, such as whether the user is available to respond to the conversation, whether the user is distracted (e.g., whether a window that is not hosting the CS is in the foreground of their display device), or whether the user is simultaneously participating in more than one CS. The determined and/or identified relevance of the content may be based on the determined content features and context features, as well as monitored user activity, inferred user-activity patterns, and/or generated user-interest models. Human agents may also be employed to analyze the context of a CS. For instance, a user may manually provide the context of the CS.

The logical and stylized responses may be generated via various ML methodologies that receive, as input, the analyzed content and context, e.g., the content and context features, as well as the relevance of the content. One or more ML methodologies may be employed in the generation of logical and stylized responses to the likely-relevant content, targeted to the user and the context of the CS.

Thus, various embodiments are directed towards an enhanced virtual assistant (VA) that provides enhanced CS services. Such enhanced CS services include, but are not limited to automatically identifying portions of a conversation within a CS that are likely-relevant to the user and automatically generating responses to the likely-relevant portions of the conversation that are specific to the user. The response may be stylized to simulate the user's conversing style. In an automatic mode, the response is automatically provided to the CS. In contrast, in a semi-autonomous mode, the response is provided to the user, such that the user may decide whether to pass along the response to the CS, or provide additional editing or stylization to the response prior to providing the response to the CS.

More particularly, the determination of the relevance of the content may be targeted to the user based on the user's interests, the user's historical and/or current user-activities, the context of the CS, and/or relationships between the user and the other users participating in the CS, as well as various other factors discussed herein. In various embodiments, the user's activity is monitored and user-activity patterns are inferred and/or learned. User activity information, such as the inferred user-activity patterns, are employed to generate various user-interest data models. That is, the embodiments employ various ML methodologies to learn topics of interests of the user. The user may assist in the generating and/or updating of user-interest models via providing user profile information and/or the manual curation of the generated user-interest models. The embodiments learn to identify relevant content via the generation of user-interest models and other data models, based on various ML methodologies.

The automatically generated logical and stylized responses may be targeted to the user based on the user-targeted relevance of the content and the context of the CS, as well as the user's preferences for stylistic and substantive features of responses. That is, the various embodiments may learn additional data models that indicate the user's preferred substantive and stylistic features to encode in the automatically generated responses. The user may assist in the generation and updating of the various data models that enable analyzing CSs, identifying relevant content of the CSs, and generating useful responses to the likely-relevant content of the CSs, via the manual curation the identification of likely-relevant content, as well as the manual curation of the automatically generated logical and stylized responses. For instance, the embodiments may update the various ML data models based on the user editing the generated logical and/or stylized responses in the semi-autonomous mode, as well as providing manually generated responses within a CS. The automatically generated logical and stylized responses may be provided to the user in a textual format and/or via audible speech that is automatically generated via text-to-voice services enabled by the VA.

For example, a stylized response may be provided via the chat window that is hosting the CS, for example within the Skype chat widow for a Skype meeting. In particular, in one example, upon returning to a CS in which the user was not actively participating, a VA or other service might provide one or more responses within the chat window. In some embodiments, the responses may be provided to the user in another window that is separate from the chat window, such that the user may manually edit and copy and paste the response into the chat window. Further, the responses may be stored, indexed, and/or archived for use in record keeping, querying, and/or training the various ML data models.

For content that is identified as highly-relevant to the user, the various embodiments may provide, real-time and/or near real-time, audible and/or visual notifications or prompts to call the user's attention to the content. For instance, as discussed herein, the determined relevance may include a determined importance or temporal urgency of the content. When a user is simultaneously participating in multiple CSs distributed across multiple windows or user-interfaces, the various embodiments may highlight or position the user-interface that includes identified highly-urgent or highly-important content, as well as the automatically generated response in the foreground of the user's display device. The user's attention may further be directed to the highly-urgent content and automatically generated response with additional selective-highlighting within the user-interface that is now in the display device's foreground. The user may provide the automatically generated response to the CS via a selection, such as a single-click selection. For example, where a user's input is solicited during the CS or where a decision is being made by members of the CS and the user's input is needed or the user would typically desire to weigh in, such highly-urgent content and the generated response may be highlighted for the user.

Thus, in addition to automatically generating logical and/or stylized responses to likely-relevant CS content, the enhanced CS services provided by the various embodiments include identifying and highlighting CS content that is highly-relevant to the user, as well as the highlighting of the responses to the highly-relevant content. The identification of highly-relevant content, as well as the generation of the logical and stylized responses is targeted to the specific user. In one embodiment, the notification to highlight highly-relevant content and responses may be provided via automatically generated speech. The speech-based notification may include the highly-relevant content, or a summarized version of the highly-relevant content, as well as the generated response. In other embodiments, the notification may simply include a spoken, or otherwise audible, indication to direct the user's attention to a specific user-interface that includes the highly-relevant content (or summary thereof) and the generated response.

In some instances, a portion of the enhanced CS services enabled by the some of the various embodiments described herein may be provided via an enhanced "VA" or at least an enhanced "chat-bot" (or simply an enhanced "bot") that is enabled with embodiments of the intelligent agent (IA) also discussed herein. Although conventional VAs and conventional chat-bots have been previously available, such conventional VAs and chat-bots are not enabled to automatically identify likely-relevant content, wherein the identification of the likely-relevant content is targeted to the user based on the user's interest and the CS context via user-interest and content-relevance data models trained based on the user's activity. Furthermore, conventional VAs and chat-bots do not generate logical and stylized responses that are targeted to user based on content-substance and content-style data models trained based on the user's participation in other CSs.

Rather, conventional VAs and chat-bots may automatically generate responses to questions posed by users of a CS. That is, conventional VAs and chat-bots are attempts at enabling an agent to pass a rudimentary form of a "Turing Test." In contrast, the various embodiments herein employ technical implementations of various ML methodologies, such as NLP, to identify relevant content generated by users and generate responses to content that is identified as likely-relevant based on trained NLP data models trained to simulate the conversational stylings of the user.

In further contrast to conventional VAs and chat-bots, the embodiments herein implement ML methodologies, such as but not limited to topic modeling and keyword analysis, to identify likely-relevant content that is targeted to the user-interests, user-activity patterns, and content substance and style preferences of the particular user. Furthermore, the relevancy of the content may be based on the context of the CS. Conventional VAs and chat-bots typically provide the same response to the same question, independent of the user that posed the question and the context that the question was asked within. That is, the content generated by a conventional VA or chat-bot is general and not dependent upon the user that the content is provided to and/or the context of the CS, such as, without limitation, the other members of the CS, other information about the CS, where the user is presently located, what type of user device the user is using to access the CS, other ongoing CSs in which the user is participating, the user's schedule, and/or other activities that the user may be engaged in during the CS. However, by employing user-specific data to generate and update data models, the various embodiments herein target the identification of content that is likely-relevant to the user and the generation of responses to the identified likely-relevant content. The relevance of the content is determined via user-interest and content-relevance data models based on the user's specific interests, activities, and the context of the CS, whereas the responses are generated via content-substance and content-style data models based on various NLP methodologies, as well as the conversational style of the user.

The user may be simultaneously participating in multiple CSs, wherein various embodiments may provide responses to the likely-relevant content in each of the CSs based on the separate contexts of each CS. For instance, a user may be simultaneously participating in a first CS, where in the context is employment related, and a second CS, wherein the context is family related. The stylized responses for the first CS may be in a conversational style appropriate for work-related conversations and the stylized responses for the second CS may be in a conversational style appropriate for family-related conversations. Similarly, the embodiments may be generating responses, in real-time or near real-time, for multiple users participating in one or more CSs. That is, the various embodiment may include multiple sets of data models, where each set of data models corresponds to a specific user. For instance, an embodiment may provide a first response for a first user participating in the CS and a second response for a second user participating in the CS. The first response is stylized in a conversational style associated with the first user and the second response is stylized in a conversational style associated with the second user. That is, each response is based on the content-relevance, content-substance, and content-style data models associated with the user corresponding to the response, as well as the context of the CS for the corresponding user.

As used herein, the terms "communication session" and "CS" may be used interchangeably to broadly refer to any session where two or more computing devices are employed to exchange information and/or data between two or more users. The information and/or data exchanged in a CS may herein be referred to as "CS content," or simply "content." For instance, a CS may include the exchange of one or more electronic mail messages (i.e., email) between two or more users, where the emails include textual and/or non-textual content. In some embodiments, a CS may be a real-time CS, such as but not limited to a "chat" or "instant messaging" (IM) session. A CS may include the exchange of textual, audible, and/or visual content. Visual content may include image, graphical, and/or video content. Thus, content may include multimedia content. Thus, two or more users may carry out a "conversation" via the exchange of content enabled by a CS.

Some CSs may include the real-time exchange of textual content (e.g., an IM or textual chat session), while other CSs involve the real-time exchange of video and/or audio content (e.g., a video chat session). In one embodiment, a CS may include the real-time exchange of audio-only content. For example, a CS may be enabled via a Voice Over Internet Protocol (VOIP). A CS may be a telephone and/or video call. For embodiments that involve a spoken conversation, i.e. the natural language utterances and/or expressions are audible, speech-to-text services may be employed to generate textual content for the analyses of the content and the context.

Although various real-time examples of CSs (i.e., those CSs that enable a real-time conversation) are herein enumerated, it should be understood that a CS may not be required to be a real-time CS. A user may, but need not, simultaneously participate in more than one CS. Thus, the various embodiments may, in real-time or near real-time, simultaneously monitor, analyze, and provide responses for multiple CSs that a user is currently participating in.

More particularly, a user may simultaneously participate in multiple CSs, wherein the enhanced CS services described herein are provided to the user for each of the multiple CSs. That is, the user being provided enhanced CS services may participate in one or more real-time "conversations" via one or more CSs. A separate or distinct group or set of users may be participating in and/or associated with each of the one or more CSs. For instance, user_A may simultaneously be participating in CS_X, CS_Y, and CS_Z, wherein user_A, user_B, and user_C are participating in (or associated with) CS_X, user_A, user_D, and user_E are participating in CS_Y, and user_A, user_B, and user F are participating in CS_Z. Thus, a user may simultaneously participate in multiple conversations, via exchanging content within multiple CS with separate associated groups of users.

The exchanged content may, but is not required to, include natural language content. That is, content may include ordered sequences of natural language utterances and/or expressions. Each utterance and/or expression may include an ordered sequence of natural language tokens (e.g., words). A unit of content may herein be interchangeably referred to as a "line of content" or simply a "content line." Thus, a CS includes an ordered sequence of content lines. Each content line may include an ordered sequence of spoken or textual natural language tokens, phrases, sentences, sentence fragments, paragraphs, alpha-numeric characters, punctuation characters, and such. A content line may be equivalent to a line of textual or spoken content in a chat session. However, it should be noted that a content line may include a fragment of a (textual or spoken) chat session line and/or an ordered sequence of multiple chat session lines. A content line may include one or more declarative statements, expository statements, questions, answers to questions, or virtually any natural language expression or utterance. Thus, a conversation carried out via a CS is comprised of the ordered sequence of content lines, i.e., the content of the CS.

CS content may include symbols, such as but not limited to mathematical, algebraic, geometric, engineering, and/or logic symbols. For instance, content may include any mathematical or logical symbols, notations, or operators, such as differential, products, or summation operators. Another example of mathematical notation included in content is tensor, matrix, and vector notations. Content may include engineering schematic symbols, such as schematic representations for resistors, diodes, and transistors.

Other symbolic content may include emojis, emoticons, avatars, (animated and/or static) GIFs, or image data, and such. For example, users frequently include emojis and/or animated GIFs in content to convey concepts. Thus, "a natural language expression" may include any such symbolic content such as mathematical notation, emojis, emoticons, and GIFs. The various natural language processing (NLP) and natural language models, such as but not limited to content-substance, content-style, and response-generation models are enabled to analyze and generate content that includes such symbolic content.

In at least one embodiment, such symbolic content may be automatically transformed into textual content via an identification of various concepts associated with the symbolic content. For example, content that includes the popular "eggplant" emoji may be analyzed to include the token or word "eggplant" wherever the emoji is included in the content. In some embodiments, metadata and/or other identifying data associated with the symbolic content may be employed in such natural language models. Image recognition, image feature extraction, or computer vision methods may be employed to analyze and/or generate such symbolic content. Thus, the natural language models may include deep learning auto encoders and/or decoders to analyze and/or generate natural language expressions including symbolic expressions.

Thus, in the various embodiments, a response may automatically be generated, wherein the response includes one or more emojis, emoticons, animated GIFS, mathematical notation, and other symbolic content. Various responses may be generated to represent likely stylistic choices of the user, such as emotions, sentiments, and the like. That is, a stylistic response may be automatically generated to include likely stylistic choices of the user, such as encoding emotions and sentiments in the response. For example, a stylistic response may be generated to represent the user's approval or happiness via the inclusion of a "happy face" emoji in the response. The content-style and response-generation models may be trained to emulate and/or simulate the user's stylistic choices of employing emojis, emoticons, and other symbolic content.

As used herein, the term "response" may refer to any content that is at least in part generated by the various embodiments described herein. The term response is used broadly and is not limited to an answer to one or more questions posed to a user. Rather, a response may be a subset of content, wherein the subset is at least partially generated via an embodiment. Thus, an automatically generated response may include one or more declarative statements, expository statements, questions, answers to questions, or virtually any natural language expression or utterance.

The term "logic response" may refer to include a response that encodes one or more content-substance features. More specifically, a logical response may include an ordered or unordered set of one or more encoded or un-encoded content-substance features. In other embodiments, a logical response includes an ordered or unordered set of natural language tokens, such as nouns and verbs. The natural language tokens may be arranged in an expression that is interpretable as the substance of the response. The term "stylized response" may refer to a response that encodes one or more content-style features as well as the content-substance features. Thus, a stylized response may include an ordered set of natural language tokens arranged in the order that simulates the conversational style of the user. The stylistic response may include additional natural language tokens to those included in the corresponding logical response to provide clarifications, modifications, or additional stylistic or substantive meaning to the tokens include in the logical response. Thus, a stylistic response may include a natural language phrase, expressions, sentence, sentence fragment, paragraph, or the like.

Content encodes one or more content features. When content is analyzed, one or more content features may be determined for each line of content. As noted throughout, when generating a response, one or more content features may be determined to encode in the generated response. Content features encoded in a content line, response line, or another portion of content may include an indication or encoding of the "speaker" of the content line. As used herein, the content's speaker refers to the user that generated the content and/or provided the content to the CS to be exchanged. In the context of a response, the speaker is the user that the response was generated for. The speaker may or may not have audibly spoken the content. For instance, a speaker may manually enter or type the content. A content feature may also include an indication of the user or group of users that the content line is directed at. For instance, if the content line includes a question directed at a particular user or group of users, a content feature for the content line may include the particular user or group of users. A content feature may also include one or more indications of whether the content line includes one or more declarative statements, expository statements, questions, responses to questions, and such.

Content features encoded in a content line, response, or another portion of content such as a contiguous block of content lines may include both content-substance features and content style features. The content-substance features of a content line may encode or indicate the conceptual or semantic components of the content line. That is, the content-substance feature may indicate the semantics, meanings, and/or intensions associated with the content line. A content-substance feature may indicate one or more topics and/or keywords associated with the content line. A content-substance feature may also indicate a sentiment of the speaker. That is, a sentiment content-substance feature may encode an identified and/or categorized opinion expressed in the content.

In contrast, the content-style features of content may encode or represent the stylistic (e.g., grammatical) choices of the speaker of the content line. That is, content-style features may indicate grammar, vocabulary, and dialogue choices of the speaker. For instance, content-style features may encode the speaking style or conversational style of the speaker. Content-style features may additionally encode one or more emotions of the speaker, e.g., anger, surprise, satisfaction, happiness, and other emotions. Content-style features may indicate the intonation, pitch, speed, and volume of the speaker, as well as changes in these features, such as speeding up, slowing down, or changing volume.

Determined contextual features for a CS may include, but are not otherwise limited to an indication or encoding of each of the users participating in and/or associated with the CS, an activity and/or engagement level of each of the associated users, and an availability of each of the associated users. Contextual features may additionally indicate initiating and terminating timestamps of the CS, the temporal duration of the CS, and an indication of other past or current CSs that the associated users have or are currently participating in. Additional contextual features may indicate an approximate geo-location and/or logical location of each associated users. A CS contextual feature may include or be based on any user profile information for each of the associated users.

A contextual feature for a CS may indicate or encode a hierarchical relational graph that indicates one or more relationships between at least some of the pairs of associated users of the CS. An indicated relationship may include a professional, personal, or genetic relationship. For instance, the relational graph may indicate a manager/subordinate relationship, a spousal/personal partnership relationship, a parent/child/sibling relationship, or any other such relationship for pairs of associated users. A contextual feature may indicate one or more social network graphs based on and/or generated from one or more social network platforms that the users employ. A contextual feature may include an indication, such as but not limited to a static or dynamic link, for materials referenced and/or exchanged in the conversation, such as emails, websites, slide decks, spreadsheets, files, or other such documents, including any multimedia content. Such multimedia content may include electronic books (e-books), audio and/or video files, animations, organization charts, or other such audible, visual, and/or textual content.

A contextual feature may encode or more contextual tags. For instance, a "social" tag may be encoded in a contextual feature for a CS that is directed towards a social conversation or interaction, whereas "work" and/or "meeting" tags may be CS contextual feature of a CS that is directed towards a work-related meeting. Contextual features may indicate or encode meeting titles, meeting subjects, meeting agendas, meeting schedules, or other such information indicating the structure and/or topics of a conversation of the CS. A contextual feature may indicate one or more privacy and/or encryption configurations of the CS. A contextual feature for a CS may encode virtually any determinable information that is indicative of a context of the CS.

A contextual feature may encode a "role" or "position" for at least a portion of the users within the CS. For instance, a contextual feature may encode whether a particular user is a "leader," "participant," or an "observer" within the CS. The context of the CS for each user may be based on their role or position within the CS. Thus, the identification of likely-relevant content and the generation of responses to the likely-content, for a particular user, may be based on their role or position within the CS, as well as the role or position of each of the other users. A contextual feature may be specific to the user. For instance, a contextual feature may indicate whether the user is available to manually provide a response to likely-relevant content or whether the user is unavailable to provide such a response. In some embodiments, a response is only automatically generated when the user is unavailable to manually provide a response. A contextual feature may indicate whether the user is distracted, or if the user is currently participating in more than one CS.

The content and contextual features of a CS may be herein collectively referred to as "CS features" of a CS. CS features may be based on data associated with any of the users participating in the CS, including but not limited to any user profile information for each of the users, such as user-interest and user-activity information. User-activity information may include monitored and/or detected user-activity, as well as determined, identified, and/or learned user-activity patterns. For instance, user-activity patterns may be learned based on monitoring and analyzing user activity.

CS features may be based on the content exchanged in the CS, as well as any data, such as but not limited to metadata, associated with the CS. Various ML methodologies may be employed to learn various data models that are employed to determine and/or identify the content and the contextual features of the CS. The embodiments employ various engines, analyzers, detectors, logic, data models, or other such components to determine and/or identify the CS features. Various embodiments of machine-learning (ML) methodologies may be employed to train models in the determination and identification of CS features. For instance, various deep-learning (DL) methodologies may be employed to develop and/or train one or more natural language models (NLM), such as but not limited to topical models, keyword models, and semantic models, to determine both content-substance and content-style features of content lines. The natural language models may include one or more trained content-substance models and one or more content-style models. The content-substance models and the content-style models may be trained based on historical CS content data. Similarly, contextual models may be trained to determine the contextual features of a CS based on historical CS contextual data. A CS feature may be an observable feature or variable. In some embodiments, a portion of the CS features may include latent and/or hidden features or variables.

A relevance for one or more of the content lines may be determined based on the CS features determined via an analysis of CS content, as well as the user-interest and content-relevance models for the user. The content-relevance model may be trained based on least the user-interest model for the user, as well as monitored user activity. That is, the user-interest model may be trained based on monitoring and/or detecting user activity and inferring user-activity patterns. In some embodiments, topics for the user's interests may be determined and/or identified based on the inferred user-activity patterns. Additionally, in some embodiments, the user may curate and/or update their user-interest models based on user profile information.

In order to generate the various data models, data corresponding to user activity may be gathered over time using sensors on one or more user devices associated with the user. From this historical user-activity information, a computer system may learn user-activity patterns associated with the user devices. By analyzing a user-activity pattern, the various data models, such as but not limited to user-interest models and content-relevance models may be inferred that are employed to identify content that is likely-relevant to the user. In some cases, the user-activity patterns may be analyzed along with sensor data collected by a user device, and the relevance of content to the user may be inferred based on determining a relevance that is consistent with the determined content-relevance model.

As further described herein, in some embodiments, user devices may employ one or more sensors to generate data relevant to a user's activity via a user device(s). The user activity may be monitored, tracked, and used for determining user-activity patterns. The terms "user-activity pattern," or simply "activity pattern" are used interchangeably and broadly herein and may refer to a plurality of user interactions conducted using one or more user devices, activity by the user on or in connection to one or more user devices, events (including actions) related to user activity, or any type of user activity determinable via a computing device, wherein the plurality of interactions, actions, events, or activity share common features or characteristics. In some embodiments, these in-common features or variables may comprise features characterizing a user activity, time, location, or other contextual information associated with the user activity, as further described herein. Examples of user-activity patterns may include, without limitation, activity patterns based on time (e.g., the user browses his bank's website near the beginning of each month to check his account balance), location (e.g., upon arriving at work in the morning, a user turns down the volume on her phone), content within and/or external to a CS (e.g., a user typically browses news-related websites followed by their social-media related websites), or other context, as described herein.

In some embodiments, the user activity may be related to a user's browsing activity, such as websites, categories of websites, or sequences of websites and/or website categories visited by a user, and user activity associated with the browsing activity. In addition or alternatively, the user activity may be related to a user's application (or app) related activity, such as application usage, which may include usage duration, launches, files accessed via the application or in conjunction with the application usage, or content associated with the application. The terms "application" or "app" are used broadly herein, and generally refers to a computer program or computer application, which may comprise one or more programs or services, and may run on the user's device(s) or in the cloud.

Based on the determined user-activity patterns and other factors, a user-interest and/or a content-relevance model may be generated and/or updated. Based on the inferred user-interest model and content-relevance model, as well as other factors, such as the context features of a CS, CS content that is likely-relevant to the user may be identified. One or more responses to the likely-relevant content may be automatically generated and provided to the user or a CS, such that the user receives an improved utility and user-experiences regarding a CS.

Accordingly, at a high level, in one embodiment, to generate the various data models that enable identifying and providing responses to likely-relevant content of a CS, user data is received from one or more data sources. The user data may be received by collecting user data with one or more sensors or components on user device(s) associated with a user. Examples of user data, also described in connection to component 210 of FIG. 2, may include information about the user device(s), user activity associated with the user devices (e.g., app usage, online activity, searches, calls, usage duration, and other user-interaction data), network-related data (such as network ID, connection data, or other network-related information), application data, contacts data, calendar and social network data, or nearly any other source of user data that may be sensed or determined by a user device or other computing device. The received user data may be monitored and information about the user activity may be stored in a user profile, such as user profile 240 of FIG. 2.

In some embodiments, based on an identification of one or more user devices, which may be determined from the user data, the one or more user devices are monitored for user activity, including the generation of content within one or more CSs that the user is currently or has previously participated in. In some embodiments, user activity monitoring may be facilitated using an application or service that runs on the monitored user device. Alternatively or in addition, the user activity monitoring may be facilitated using an application or service that runs in the cloud, which may scan the user device, or detects online activity associated with the user device, such as http requests or other communication information, or otherwise receive information about user activity from the user device.

User data may be analyzed to detect various features associated with user actions. Detected user actions or "activity events," which may include actions such as websites visited, applications launched, or other actions similar to those described herein, may be logged with associated user-activity contextual data, for example, by logging the observed user action with a corresponding time stamp, location stamp, and/or associating the activity event with other available contextual information. In some embodiments, such logging may be performed on each user device, so that user-activity patterns may be determined across devices. Further, in some embodiments, cloud-based user-activity information sources may be used such as online user calendars or user activities determined from social media posts, emails, or the like. These sources also may be used for providing other user-activity context to the user activity detected on the user devise(s). In some embodiments, user activity logs from multiple user devices and available user activity information from cloud-based sources may be combined, thereby representing a composite user activity history. The user activity logs, including corresponding user-activity contextual information, may be stored in a user profile associated with the user, such as user profile 240 of FIG. 2.

Figure 2:
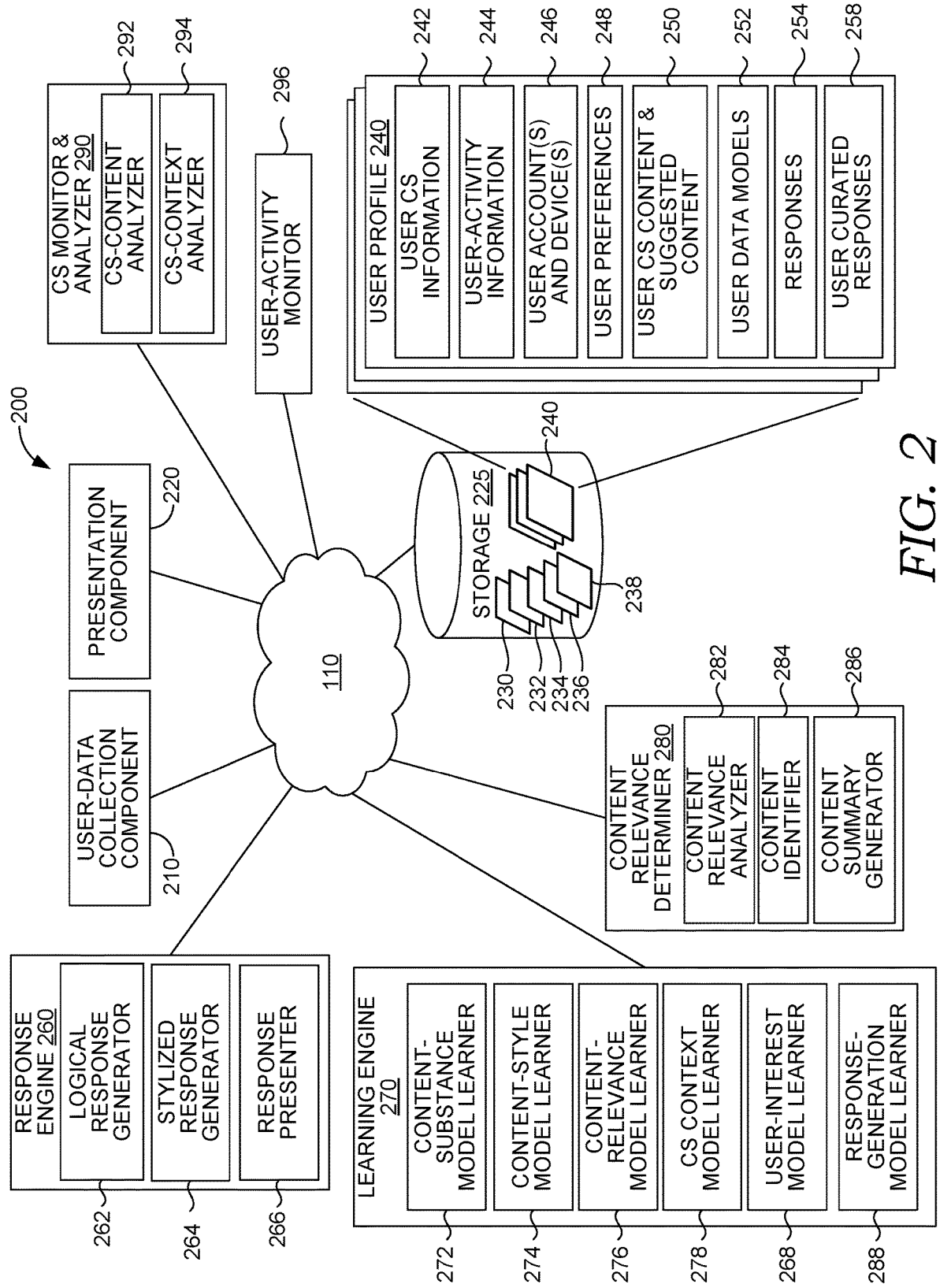
FIG. 2 is a diagram depicting an example computing architecture suitable for implementing aspects of the present disclosure.

From the activity logs or user activity data, historical user activity information may be determined and provided to an inference and/or learning engine, such as learning engine 270 of FIG. 2. Based on an analysis of historical user activity, and in some cases current sensor data regarding user activity, one of a user-interest model, a content-relevance model, a content-substance model, a content-style model, and a CS context model may be generated, generate, and/or trained. In particular, the learning engine may conduct an analysis of the historical user activity information to identify the user's topics of interest, as well as content and contextual features that may be employed to identify, highlight, and/or provide responses to content that is likely relevant to the user.

In some embodiments, the various data models may be employed to determine a corresponding confidence weight or confidence score to one or more CS features that indicate a confidence and/or a probability associated with determining the CS feature. For instance, for an trained user-interest model, an interest confidence score may be based on a likelihood or probability that a particular topic is of interest to the user given the context of the CS and the user's activities, which may be determined by the number of observations used to determine a user-activity pattern associated with the topic, how frequently the user activity is consistent with the topic, the age or freshness of the activity observations, the number of features in common with the activity observations that are associated with the topic, or similar measurements. In some instances, the interest confidence score may be considered when identifying content that is relevant to the user.

Further, in some embodiments, a minimum or maximum confidence score may be needed to determine the CS feature. For example, in one embodiment, a CS feature threshold of 0.6 (or just over fifty percent) is utilized such that only CS features are identified when the associated confidence score corresponds to a 0.6 (or greater) likelihood, confidence, or correlation. Nevertheless, where confidence scores and thresholds are used, CS features with confidence scores less than the threshold may still be employed in the various embodiments. However, these CS features may be deemphasized in the analyses. That is, for each of the determinations and/or identification in the various embodiments, the influence of any single determined CS feature may be weighted based on the associated confidence score.

In some embodiments, crowdsourced training data, which may include user activity history, may also be utilized in conjunction with the generating and updating of any of the various data models, such as but not limited to the user-interest and the content-relevance models. For example, for a given user, a set of other users similar to the given user may be identified, based on having features or characteristics in common with the given user. This might include other users located in proximity to the given user, the given user's social media friends, work colleagues (which may be determined from an analysis of contextual information associated with the given user), other users with similar user activity patterns, or the like. Information about the data models from the other users may be relied upon for inferring patterns of user activity for the given user. This may be particularly useful in situations where little user activity history exists for the given user, such as where the user is a new user. In some embodiments, data models from similar users may be imputed to the new user until enough user history is available for the new user to determine statistically reliable user-interest and content-relevance predictions, which may be determined based on the number of observations included in the user activity history information or the statistical confidence of the determined user activity patterns, as further described herein. In some cases, where the data models comes from other users, the resulting inferred user interests and content relevance for the given user may be assigned a lower confidence score.

In some embodiments, the determining of a CS feature, a user interest, or a content relevance may be based on a semantic analysis performed on data associated with the CS, such as metadata. For example, CS features may be categorized (such as by type, similar time frame or location, for example), and related CS features may be identified in determining a relevance of the content. In some embodiments, a semantic knowledge representation, such as a relational knowledge graph, may be employed. In some embodiments, the semantic analysis may use rules, logic such as associations or conditions, or classifiers.

The semantic analysis may also be used to characterize the context of a CS, such as determining that a location associated with the various user activity corresponds to a hub or venue of interest to the user based on frequency of visits, such as the user's home, work, gym, etc. (For example, the user's home hub may be determined to be the location where the user spends most of her time between 8 PM and 6 AM.) Similarly, the semantic analysis may determine time of day that correspond to working hours, lunch time, commute time, etc.

In this way, the semantic analysis may be employed to determine user interest. For example, in addition to determining a particular website that the user visited at a certain time, such as visiting CNN.com over lunch, the category of the website may be determined, such as a news-related website. Similarly, the semantic analysis may associate the user interest as being associated with work or home, based on the characteristics of the activity (e.g., a batch of online searches about chi-squared distribution that occurs during working hours at a location corresponding to the user's office may be determined to be a work-related interest, whereas streaming a movie on Friday night at a location corresponding to the user's home may be determined to be home-related interest). These aspects characterizing the user's interests may be considered when determining the relevance of content and identifying likely-relevant content.

For example, an interest in news-related websites may be determined where a user routinely visits news-related websites.

As described previously, the user activity patterns may be used to infer user-interest and content-relevance data models. From these predictions of user interests and content relevance, various implementations may provide enhanced user experiences. For example, some embodiments may provide timely, relevant delivery or presentation of summarized versions of likely-relevant content of a CS, or highlighting urgent content in real-time, as well as responses to the likely-relevant or urgent content. Other improvements include improvements to user device performance and network bandwidth usage. Some embodiments may be carried out by a personal and/or virtual assistant application or service, which may be implemented as one or more computer applications, services, or routines, such as an app running on a mobile device or the cloud, as further described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106, or may be incorporated and/or integrated into one or more of those components. In one embodiment, one or more of data sources 104a though 104n comprise one or more sensors, which may be integrated into or associated with one or more of the user device(s) 102a, 102b, or 102n or server 106. Examples of sensed user data made available by data sources 104a though 104n are described further in connection to user-data collection component 210 of FIG. 2.

Operating environment 100 can be utilized to implement one or more of the components of system 200, described in FIG. 2, including components for collecting user data, generating a data model, monitoring and analyzing one or more CSs, and identifying and providing responses to relevant content of the one or more CSS.

Referring now to FIG. 2, with FIG. 1, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, communication session (CS) monitor and analyzer 290, learning engine 270, response engine 260, content relevance determiner 280, storage 225, user-activity monitor 296. CS monitor and analyzer 290 (including its components 292 and 294), user-activity monitor 296, response engine 260 (including its subcomponents 262, 264, and 266), user-data collection component 210, presentation component 220, learning engine 270 (including subcomponents 272, 274, 276, 278, 268, and 288), and content relevance determiner 280 (including subcomponents 282, 284, and 286) may be embodied as a set of compiled computer instructions or functions, program modules, computer software services, or an arrangement of processes carried out on one or more computer systems, such as computing device 600 described in connection to FIG. 6, for example. In various embodiments, portions of the components of system 200 may be implemented via hardware-based logic components or devices.

In one embodiment, the functions performed by components of system 200 are associated with one or more virtual assistant (VA), chat-bot applications, intelligent agents (Isa), services, and/or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s).

Alternatively, or in addition, the functionality of these components and/or the embodiments described herein may be performed, at least in part, by one or more hardware, software, middleware, and/or firmware logic components. For example, and without limitation, illustrative types of hardware logic components or devices that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Such hardware, software, middleware, and/or firmware components may include but are not otherwise limited to CS analysis logic 230, CS response logic 232, content-relevance logic 234, summary logic 236, and/or ML logic 238. Although FIG. 2 shows logic components 230-238 included in storage 225, other embodiments are not so constrained and logic components 230-238 may be located and/or distributed in engines, analyzers, determiners, monitors, generators, learners, identifiers, presenters, and other components of system 200. For instance, CS analysis logic 230 may be implemented via CS monitor and analyzer 290. CS response logic 232 may be implemented via response engine 260. Content-relevance logic 234 may be implemented via content-relevance determiner. ML logic may be implemented via learning engine 270, and the like. Additionally, although functionality is described herein with regards to specific components shown in example system 200, it is contemplated that in some embodiments functionality of these components can be shared or distributed across other components.

Learning engine 270 is generally responsible for generating, updating, and/or training the various data models employed to analyze CS content, identify relevant content, and generate responses to the relevant content. The various components of system 200 may provide training data to learning engine 270 via network 110. In some embodiments, training data may be provided to learning engine 270 via sources not included in system 200. Once generated, the various data models may be implemented by one or more of the components of system 200 to analyze, identify, and provide responses to likely-relevant portions of the CS content. The data models generated, updated, or trained via learning engine 270 may include one or more of a content-substance model, a content-style model, a CS context model, a user-interest model, a content-relevance model, and a response-generation model.

As used herein, the terms "data model," or "model" may be used interchangeable to refer a one or more descriptions, rules (stochastic or deterministic), functions, modules, components, or the like that are enabled to map input data to output data. That is, a data model may receive input data, and generate output data based on the input data and various rules, relationships, correlations, mappings, networks, logic, inductive and/or deductive chains, or other such machinery included in the data model. For instance, a data model may include a chain or network of Boolean logic operations. In the various embodiments, a data model receives input data, such as but not limited to the content of a CS, and generates output data, based on the input data. For instance, a data model may generate a list of one or more topics that the discussion encoded in the content is directed towards. Additional output data generated by a data model may include a score or weight associated with each of the topics, where the score indicates a measure of the dominance of significance of the topic within the conversations.

As a non-limiting example, a data model may include a set or list of topics that are weighted with respect to a determined level of interest. For instance, a data model may be embodied as a knowledge graph, such as but not limited to those often employed in search engines. A data model may include a concept or topic map that indicates relationships between concepts or topics. In the various embodiments, a data model may be a parameterized data model. That is, a data model is implemented by the choice of one or more parameters. Such parameters may include various weights, coefficients, or the like.

In some of the embodiments, a data model may be a machine learning (ML) data model. A ML data model is one that employs data to determine and/or learn values for the one or more parameters. That is, a ML data model may be trained via training or baseline data. In some embodiments, once at the model has been at least trained in a preliminary sense, the model may be refined and/or updated based on additional data generated via the employment of the model. For instance, an ML data model may be customized to a particular user based on training the ML model with data that is specific to the user. Although the various embodiments may discuss ML data models, it should be understood that the embodiments are not so limited. For instance, a data model may include a collection of data specific to one or more users, a set of rules, a set of heuristics, and one or more deterministic or stochastic algorithms. Such algorithms may include genetic algorithms, i.e., algorithms generated via reproduction, recombining, and/or mutating portions of the algorithm, such that efficient and/or highly predictive portions of the algorithm are advantaged and accumulated through the evolution mechanism.

The various "data models", or simply "models", may include or may be implemented via various trained networks (or network data models) and/or architectures, such as neural network data models or architectures. A ML data model may include various trained deep-learning networks, such as but not limited to feedforward networks, convolutional/deconvolutional networks, recurrent neural networks (RNNs), recursive neural networks, long-short term memory (LSTM) networks, autoencoders/decoders, and such. The trained ML data models may include various natural language models (NLM), n-grams, speech-recognition models, text-to-speech models, and such. The ML data models may include linear factor models, vector machines, structured and/or unstructured probabilistic models, partition functions, deep-generative models, and such. In one embodiment, a ML data model is trained via one or more Monte Carlo simulation (MCS) or other randomized and/or probabilistic simulation methods. A data model may include various estimators, such as but not limited to maximum likelihood estimator or a Bayesian estimator. One or more data models may be based off state machine or a Markov process. For instance, a data model may include a Markov chain. The various ML data models may be generated via supervised and/or unsupervised learning methodologies.

As such, the various ML data models may include the parameters (e.g., weights) determined via the training process, as well as any network structure indicating the relationships between the various nodes, neurons, or the like of any network, mapping, graph, or other such structure, topology, and/or architecture that is associated with and/or enables any of the various data models. Other ML and/or artificial intelligence (AI) methodologies may be employed to generate, update, and/or train the various ML data models.

Briefly, a user-interest model learner 268 may generate, update, and/or train a user-interest model. User-activity information, such as but not limited to user-activity information 244 and other information from user profile 240 may be employed to generate the user-interest models. A content-substance model learner 272 may generate, update, and/or train a content-substance natural language model. Content-style model learner 274 may generate, update, and/or train a content-style natural language model. A CS context model learner 278 may generate, update, and/or train a CS context natural language model. A response-generation model learner 288 may generate, update, and/or train a response-generation natural language model. A content-relevance model learner 276 may generate, update, and/or train a content-relevance natural language model based on the user-interest model and other information associated with the user, such as user activity information and/or user-activity patterns. Such data models including natural language models may be generated and/or updated based on training data that includes the content of various CS. That is, content from a CS log, as well as other data associated with a CS, such as metadata, may be employed to train these natural language models. Each of these data models may be targeted to a specific user based on the selection of training data employed to generate and/or update the data models.

A trained content-substance data model may receive as input CS content, and provide as output one or more content-substance features encoded in the content. A trained content-substance data model may receive as input CS content, and provide as output one or more content-style features encoded in the content. A trained CS context data model may receive as input CS data, including but not limited to metadata, and provide as output one or more contextual features associated with a CS. A trained content-relevance data model may receive as input CS contextual features and content, as well as the determined content-substance and content-style features, and provide as output a determination of the relevance of the content based on the user-interest data model and the various CS features.

A trained response-generation model may receive as input CS content, such as but not limited to content that has been identified as at least likely-relevant to the user. Also received as input may include the contextual features of the CS, as well as the content-substance and content-style features encoded in the input content. The response-generation model may be employed to determine one or more content-substance and one or more content-style features to encode in logical and stylized responses to the input content, based on the input contextual features, content-substance features, content-style features, the trained content-substance and content-style data models. The response-generation model may generate, as output, the logical responses and the stylized responses that encode the determined content-substance and content-style features.

One or more of the trained data models may be stored in user profile 240. For instance, user data models 252 may store various content-substance, content-style, content-relevance, CS context, and user-interest models. ML logic 238 may implement or otherwise enable the various ML methodologies employed by learning engine 270. That is, in some embodiments, content-substance model learner 272, content-style model learner 274, content-relevance model learner 276, CS context model learner 278, and/or user-interest model learner 268 may be implemented via hardware, software, middleware, and/or firmware logic included in ML logic 238. For example, ML logic 238 may enable the various neural networks employed in the training of the various data models. Although ML logic 238 is shown included in storage 225, in other embodiments, ML logic 238 may be embedded and/or instantiated in other components of system 200, such as but not limited to learning engine 270.

CS monitor and analyzer 290 is generally responsible for monitoring and analyzing the content and context of the one or more CSs that the user is currently participating in, or has previously participated in. As such, CS monitor and analyzer 290 may receive various data associated with each CS that the user is or has participated in. The various received data may include the content and metadata associated with the CS. CS monitor and analyzer 290 may include various subcomponents, such as but not limited to CS-content analyzer 292 and CS-context analyzer 294. The functionalities and/or features of data models associated with the subcomponents of CS monitor and analyzer 290 may be enabled and/or implemented via CS analysis logic 230. That is, CS analysis logic 230 may implement the various analyses for determining the substance and style of the content, as well as the context of the CS as described in conjunction with the various embodiments. As such, CS analysis logic 230 may implement various NLP methodologies, neural network architectures, and/or statistical models. Although CS analysis logic 230 is shown included in storage 225, in other embodiments, CS analysis logic 230 may be embedded and/or instantiated in other components of system 200, such as but not limited to the various subcomponents of CS monitor and engine 290.

CS-content analyzer 292 may analyze, in real-time or near real-time, both the substance and style of the content of the one or more CSs. The analyses may be based on the content-substance and content-style models, as well as various other models and/or analyses to determine both the substance and the style of the content from each of the users participating in each of the CS. The CS-context analyzer 294 may analyze the context of the one or more CSs, via the CS context model, as well as various other models and/or analyses.

More particularly, the CS content analyzer 292 may analyze, in real-time or near real-time, each content line (or blocks of content lines) of each CS that a user is or has participated in. CS content analyzer 292 may determine the substance and style of each content line, as well as the conversation as a whole, carried out within the CS based on the content-substance model and the content-style model, as well as other natural language processing (NLP) methodologies. The content-substance and content-style models may include a combination of one or more natural language models (NLM), including but not limited to n-grams, neural language models, maximum entropy language models, and such. Such NLMs may be based on ML methodologies, such as but not limited to deep learning (DL) methodologies. Thus, the various data models may employ and/or be implemented via neural networks, such as but not limited to feedforward networks and RNNs, including an LSTM.

The content-substance model is employed to determine the substance of the content. Accordingly, the content-substance model may be a combination of one or more semantic language models, including but not limited to topic models and keyword models. For instance, a topic model may enable a determination of a nested hierarchy of topics that the conversation embedded in the content is directed to. A confidence score may be associated with each of the topics, wherein the associated confidence score indicates a confidence and/or probability that the content is indeed directed to the topic. Based on the received content and the one or more content-substance models, CS-content analyzer 292 may determine one or more observable, hidden, and/or latent content features, such as but not limited to content-substance and content-style features. Determining such content features via the various data models may be based on data associated with any of the users participating in the CS, including but not limited to any user profile information for each of the users (e.g., user profile 240), such as user-interest and user-activity information. As discussed below, user-activity information may include monitored and/or detected user-activity, as well as determined, identified, and/or learned user-activity patterns. For instance, user-activity patterns may be learned based on monitoring and analyzing user activity. Content features may be based on the content exchanged in the CS, as well as any data, such as but not limited to metadata, associated with the CS.

A content feature may include an indication of the speaker of one or more content lines, as well as an indication of the user or group of users that the content lines are directed at. For instance, if the content line includes a question directed at a particular user or group of users, a content feature for the content line may include the particular user or group of users. A content feature may also include one or more indications of whether the content line includes one or more declarative statements, expository statements, questions, responses to questions, and such.

The content-substance features indicate the semantics or meanings of the natural language utterances or expressions embedded in the conversations carried out via the CS. That is, the content-substance features may indicate topics being conversed about, as well as the intentioned meaning and the sentiments of the conversation. One or more determined content-substance features may be associated with an isolated content line, a block of content lines associated with the same or separate speakers, or the entire conversation.

In contrast, the determined content-style features of one or more content lines may encode or represent the stylistic (e.g., grammatical) choices of the speaker of the content line, i.e., the conversational style of the speaker. That is, content-style features may indicate grammar, vocabulary, and dialogue choices of the speaker. For instance, content-style features may encode the speaking style of the speaker. Content-style features may additionally encode one or more emotions of the speaker, e.g., anger, surprise, satisfaction, happiness, and other emotions. Content-style features may indicate the intonation, speed, and volume of the speaker.

The CS-context analyzer 294 may analyze, in real-time or near real-time, the context of the CS. The context analyzer 294 may determine contextual features of the CS based on a CS context model and data, such as metadata, associated with the CS. Contextual features for a CS may include, but are not otherwise limited to an indication or encoding of each of the users participating in and/or associated with the CS, an activity and/or engagement level of each of the associated users, and an availability of each of the associated users. Contextual features may additionally indicate initiating and terminating timestamps of the CS, the temporal duration of the CS, and an indication of other past or current CSs that the associated users have or are currently participating in. Additional contextual features may indicate an approximate geo-location and/or logical location of each associated users. A CS contextual feature may include or be based on any user profile information for each of the associated users.

A contextual feature for a CS may indicate or encode a hierarchical relational graph or map that indicates one or more relationships or mapping between at least some of the pairs of associated users of the CS. An indicated relationship may include a professional, personal, or genetic relationship. For instance, the relational graph may indicate a manager/subordinate relationship, a spousal/personal partnership relationship, a parent/child/sibling relationship, or any other such relationship for pairs of associated users. A contextual feature may indicate one or more social network graphs based on and/or generated from one or more social network platforms that the users employ. A contextual feature may include an indication, such as but not limited to a static or dynamic link, for materials referenced and/or exchanged in the conversation, such as emails, websites, slide decks, spreadsheets, files, or other such documents, including any multimedia content. Such multimedia content may include electronic books (e-books), audio and/or video files, animations, organization charts, or other such audible, visual, and/or textual content.

A contextual feature may include or more contextual tags. For instance, a "social" tag may be contextual feature for a CS that is directed towards a social conversation or interaction, whereas "work" and/or "meeting" tags may be CS contextual feature of a CS that is directed towards a work-related meeting. Contextual features may indicate or encode meeting titles, meeting subjects, meeting agendas, meeting schedules, or other such information indicating the structure and/or topics of a conversation of the CS. A contextual feature may indicate one or more privacy and/or encryption configurations of the CS. A contextual feature for a CS may encode virtually any determinable information that is indicative of a context of the CS.

Content relevance determiner 280 and its subcomponents are generally responsible for determining the relevance of the content of one or more CSs, identifying content that is likely to be relevant to the user, and notifying the user, in real-time, regarding any content that is identified as highly relevant and/or urgent to the user. As such, content relevance engine may receive the content, as well as the determined CS features (e.g., CS content features and contextual features) from the CS monitor and analyzer 290. Determining the relevance of the content may be based on the content features and the contextual features, as well as monitored user activity, the user-interest model, and the content-relevance model.

The trained user-interest model may be employed to determine the user's interests, i.e., one or more topics that are of interest to the user based on the context of the CS, e.g., the contextual features of the CS. Based on the user-interest model and the contextual features of the CS, one or more topics of interest may be scored and/or ranked via a weighting or interest score for the topic. The determined topics may be based on various contexts of a CS. For instance, the determined user interests for a CS that has an employment-related context may be separate from the user-interests for a CS that has a more personal-related context. Thus, the user-interest, as determined via the user-interest model may be dependent upon the context of the one or more CSs.

More particularly, the user-interest model may probabilistically predict and/or infer a hierarchical representation (such as a graph or a map) of the user's interests. Via the user-interest model, a hierarchy of the user's interest may be modeled as one or more directed or undirected graphs of trees. For each of a plurality of topics, the user-interest model may predict a normalized interest score or weight for the user's interest in the topic. The interest score may indicate a probabilistic correlation between the user's interests and the topic. The probabilistic correlation may be based on as least monitored user-activity, as well as others factors discussed herein.

The plurality of topics, as determined via the user-interest model, may be arranged in a cascading hierarchy that includes a plurality of nested sub-topics. Some topics may be positioned in multiple locations in one or more cascading tree-graphs and have separate associated interest scores. For instance, a first set of topics may be associated with the user's employment. That is, each of the topics in the first set of topics is positioned in one or more branches of a tree-graph descending from a node associated with the user's employment. A separate set of topics may be associated with the user's hobbies. That is, each of the topics in the second set of topics is positioned in one or more branches of the same or another tree-graph descending from another node that is associated with the user's employment. The intersection of the first and second topic sets may be a non-empty set. For instance, Topic_A may be included in each of the first and second topic sets. The interest score for Topic_A descending from the user's employment node may be difference than the interest score for Topic_A descending from the user's hobbies node. As discussed throughout, identified CS contextual features may be employed to determine which interest score for Topic_A is relevant for a particular CS.

It should be understood that the various structures of a user-interest model discussed herein are exemplary, and other interest-user models may be employed. Essentially, a user-interest model quantifies the user's interest in one or more topics, which may be encoded in a content-substance feature of the content.

A content relevance model enables the determination of relevance for a portion of content, such as one or more content lines. A relevance for content may include one or more probabilities, wherein the one or more probabilities correlate with the likelihood that the content is relevant to the user. The one or more probabilities may be structured as a normalized scalar, vector, a matrix, a tensor, or some of the data structure such as a multidimensional array. Each component of the data structure indicates a probability that the content is relevant to the use, with respect to one or more of the user's interests. In some instances, a component of the determined content relevance may indicate a temporal urgency of the content. That is, the component may indicate that the content is of an urgent nature and should be brought to the user's interests very soon. In one embodiment, a relevance for content includes an overall relevance that is a combination of the one or more probabilities corresponding to the various topics of interest to the user.

It should be understood that the various structures of a content relevance model discussed herein are exemplary, and other content relevance models may be employed. Essentially, a content relevance model quantifies one or more probabilities regarding the relevance and the temporal urgency of content, such as a content line or a block of one or more content lines. That is, a content relevance model enables a mechanism for determining and/or identifying the content of a CS that is likely to be relevant, based on the analyzed content and the context of the CS, as well as the user' interests and activities.

Content relevance determiner 280 employs data models such as but not limited to the user-interest model and the content-relevance model to determine the relevance of the content of one or more CSs, identify likely-relevant and/or highly-relevant content for the user, and provide the user notifications for the identified highly-relevant content. Content relevance determiner 280 may include various subcomponents, such as but not limited to content relevance analyzer 282, content identifier 284, and content summary generator 286. The functionalities of and/or data models associated with the subcomponents of the content relevance determiner 280 may be enabled and/or implemented via content-relevance logic 234. That is, content-relevance logic 234 may implement the various analyses for determining the relevance of each portion of CS content, identifying the portions of the content that are likely relevant to the user (i.e., likely-relevant content portions), based on the determined relevance, and providing one or more summaries of content that is identified as highly relevant, as described in conjunction with the various embodiments. As noted above, in some embodiments, content-relevance logic 234 may be included in and/or implemented via content relevance determiner 280. As such, content-relevance logic 234 may implement various NLP methodologies, neural network architectures, and/or statistical models. Although content-relevance logic 234 is shown included in storage 225, in other embodiments, content-relevance logic 234 may be embedded and/or instantiated in other components of system 200, such as but not limited to the various subcomponents of content relevance determiner 280.

More particularly, embodiments content relevance analyzer 282 may determine a relevance for at least portions of the received content. As noted above, the relevance for a portion of content may include one or more probabilities, wherein the one or more probabilities correlate with the likelihood that the content is relevant to the user. The determined relevance may be based on the content-relevance model, as well as the user-interest model, and the determined CS features, such as but not limited to contextual features of the CS and the content features of the content. Accordingly, content relevance analyzer 282 may receive the contextual features, as well as the content-substance and content-style features from the CS monitor and analyzer 290.

The content identifier 284 may determine and/or identify content that is likely-relevant to the user based on the determined relevance for each portion of the content. Identifying the likely-relevant content may be based on one or more relevance thresholds. That is, content may be identified as likely-relevant if one or more of the relevant probabilities or scores is greater than a relevance threshold. In one embodiment, the content may be identified as likely-relevant if the overall relevance is greater than an overall relevance threshold. In some embodiments, the content may be identified as likely-relevant if the probability corresponding to the temporal urgency is greater than an urgency threshold. One or more relevance thresholds may be provided by the user via user preferences 248 and/or other information included in user profile 240.

In other embodiments, the likely-relevant content may be identified based on other methods. In one embodiment, determining the likely-relevant content may be based on ML methodologies. For instance, the user may manually curate an automatically generated response or manually provide a response. The curated and/or manually generated responses may be stored in user curated responses 258 and may serve as "ground-truth" responses. Various ML methodologies may learn data models to learn to identify the likely-relevant content. In one embodiment, using manually curated responses as "ground-truth" responses enables the automatic determination of one or more relevance thresholds. In various embodiments, the content that is identified as likely-relevant may be provided and/or shown to the user. The user may curate the content that is identified as likely-relevant to further train the content-relevance models.

The content identifier 284 may identify at least portions of the content as highly-relevant to the user if at least one of the relevant probabilities is greater than a highly-relevant threshold, which may be greater than a threshold employed to identify likely-relevant content. That is, the portions of the content that are identified as highly-relevant may be a subset of the portions of content that is identified as likely-relevant. In one embodiment, content may be identified as highly-relevant if the probability corresponding to the temporal urgency is greater than an urgency threshold.

For content that is identified as highly-relevant to the user, the various embodiments may provide, real-time and/or near real-time, audible and/or visual notifications or prompts to call the user's attention to the content and the automatically generated responses to such highly-relevant content. Content relevance determiner 280 may enable providing the user with such notifications. When a user is simultaneously participating in multiple CSs distributed across multiple windows or user-interfaces, content relevance determiner 280 may highlight or position the user-interface that includes identified highly-relevant content and the generates responses in the foreground of the user's display device. The user's attention may further be directed to the highly-relevant content and generated responses with additional selective-highlighting within the user-interface that is now in the display device's foreground. Thus, content relevance determiner 280 may highlight CS content that is highly-relevant to the user and the generated responses, where the identification of highly-relevant content is targeted to the specific user via content identifier 284. In one embodiment, the notification to highlight highly-relevant content and responses may be provided via automatically generated speech. The speech-based notification may include the highly-relevant content, a summarized version of the highly-relevant content, or simply a spoken, or otherwise audible, indication to direct the user's attention to a specific user-interface, as well as the generated responses.

The content relevance determiner 280 may determine contextual features that are external to the CS. The user's location is one exemplary external contextual feature, e.g., the user's current location may be compared to their residence or workplace to generate additional contextual features. For instance, an external contextual feature may be determined when a user resides in the U.S. but is visiting Paris. Such external contextual features may be employed to identify content relating to Paris likely-relevant in such scenarios, wherein in other contexts, Paris related content may not be relevant to the user.

The content summary generator 286 may generate a summary of the content that is identified as likely-relevant or even highly-relevant. The summary may be provided to the response engine 260. In some embodiments, the summary of the likely-content may be provided to the user.

Response engine 260 is generally responsible for generating the responses to the likely-relevant content, as well as providing the responses to the user (when operated in semi-autonomous mode) or to the CS (when operated in autonomous mode). The functionalities and/or operations of response engine 260 may be implemented via CS response logic 232. As noted above, CS response logic 232 may be included in and/or implemented via response engine 260. More particularly, the logical response generator 262 may determine one or more content-substance features for a response to input content, such as the content that is identified as likely-relevant content based on the content substance model for the user. The logical response generator 262 may employ the response-generation model, as well as various other NLP models, to determine content-substance features to encode in the logical response based on the determined the content-substance and content-style features included in the identified likely-content. The response-generation model may include or employ the content-substance model in the determination of the content-substance features to include in a response based on the content-substance and content-style features included in the likely-relevant content. The logical response generator 262 may generate a logical response that encodes the determined content-substance features for the response via NLP models. The logical response may be based on a summary of the likely-relevant content, such as the summary generated by content summary generator 286.

The stylized response generator 264 may generate a stylized response based on the logical response. The stylized response generator 264 may employ the response-generation model for the user, the content-style model for the user, as well as various other NLP models to generate the stylized response. More particularly, the response-generation model and the content-style model may be employed to determine content-style features to encode in the stylized response. The stylized response generator 264 updates the logical response and/or generates a stylized response to encode the content-substance features, as well as the determined content-style features.

Response presenter 266 may provide at least one of the stylized response or the logical response. For instance, when operated in autonomous mode, the stylized response may be provided to the CS. When operated in semi-autonomous mode, the stylized response may be provided to the user. In one embodiment, the logical response is provided to the user, such that the user may edit the logical response and/or manually generate a stylized response to provide to the CS.

Response generator may provide a textual version of the response. In some embodiments, response presenter 266 includes a text-to-speech module that generates an audible version of the response, i.e., a generated spoken version of the response. In some embodiments, response presenter 266 employs ML methodologies to learn and emulate the voice and speaking patterns of the user. Thus, a computer-generated spoken version of the response may be provided to the CS, such that the spoken versions sounds as if the user has indeed spoken the automatically generated response.

Continuing with FIG. 2, user-data collection component 210 is generally responsible for accessing or receiving (and in some cases also identifying) user data from one or more data sources, such as data sources 104*a* and 104*b* through 104*n* of FIG. 1. In some embodiments, user-data collection component 210 may be employed to facilitate the accumulation of user data of a particular user (or in some cases, a plurality of users including crowdsourced data) for user activity detector 296, content-relevance model learner 276, or a user-interest model learner 268. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (i.e., user data that specifically identifies particular users) is either not uploaded or otherwise provided from the one or more data sources with user data, is not permanently stored, and/or is not made available to user-activity monitor 296 and/or learning engine 270.

User data may be received from a variety of sources where the data may be available in a variety of formats. For example, in some embodiments, user data received via user-data collection component 210 may be determined via one or more sensors, which may be on or associated with one or more user devices (such as user device 102*a*), servers (such as server 106), and/or other computing devices. As used herein, a sensor may include a function, routine, component, or combination thereof for sensing, detecting, or otherwise obtaining information such as user data from a data source 104*a*, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events; etc.) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

User-activity monitor 296 is generally responsible for monitoring user data for information that may be used for determining user activity information, which may include identifying and/or tracking features (sometimes referred to herein as "variables") or other information regarding specific user actions and related user-activity contextual information. Embodiments of user-activity monitor 296 may determine, from the monitored user data, user activity associated with a particular user. As described previously, the user activity information determined by user-activity monitor 296 may include user activity information from multiple user devices associated with the user and/or from cloud-based services associated with the user (such as email, calendars, social-media, or similar information sources), and which may include contextual information associated with the identified user activity. User-activity monitor 296 may determine current or near-real-time user activity information and may also determine historical user activity information, in some embodiments, which may be determined based on gathering observations of user activity over time, accessing user logs of past activity (such as browsing history, for example). Further, in some embodiments, user-activity monitor 296 may determine user activity (which may include historical activity) from other similar users (i.e., crowdsourcing), as described previously.

In some embodiments, information determined by user-activity monitor 296 may be provided to any of learning engine 270, response engine 260, CS monitor and analyzer 290, and/or content relevance determiner 280. As described previously, user activity features may be determined by monitoring user data received from user-data collection component 210. In some embodiments, the user data and/or information about the user activity determined from the user data is stored in a user profile, such as user profile 240.

In an embodiment, user-activity monitor 296 comprises one or more applications or services that analyze information detected via one or more user devices used by the user and/or cloud-based services associated with the user, to determine activity information and related contextual information. Information about user devices associated with a user may be determined from the user data made available via user-data collection component 210, and may be provided to user-activity monitor 296, an activity pattern inference engine (not shown in FIG. 2), or other components of system 200.

More specifically, in some implementations of user-activity monitor 296, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of user-activity monitor 296, or its subcomponents, may determine a device name or identification (device ID) for each device associated with a user. This information about the identified user devices associated with a user may be stored in a user profile associated with the user, such as in user accounts and devices 244 of user profile 240. In an embodiment, the user devices may be polled, interrogated, or otherwise analyzed to determine information about the devices. This information may be used for determining a label or identification of the device (e.g., a device ID) so that user interaction with the device may be recognized from user data by user-activity monitor 296. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

User-activity monitor 296 may comprises a user activity detector and other subcomponents such as a user-activity contextual information extractor. In some embodiments, user-activity monitor 296, one or more of its subcomponents, or other components of system 200, such as learning engine 270 may determine interpretive data from received user data. Interpretive data corresponds to data utilized by these components of system 200 or subcomponents of user-activity monitor 296 to interpret user data. For example, interpretive data can be used to provide other context to user data, which can support determinations or inferences made by the components or subcomponents. Moreover, it is contemplated that embodiments of user-activity monitor 296, its subcomponents, and other components of system 200 may use user data and/or user data in combination with interpretive data for carrying out the objectives of the subcomponents described herein. Additionally, although several examples of how user-activity monitor 296 and its subcomponents may identify user activity information are described herein, many variations of user activity identification and user activity monitoring are possible in various embodiments of the disclosure.

User-activity monitor 296, in general, is responsible for inferring one or more user-activity patterns based on monitoring the user activity. Embodiments of user-activity monitor 296 may be used for determining current user activity or one or more historical user actions. Some embodiments of user-activity monitor 296 may monitor user data for activity-related features or variables corresponding to user activity such as indications of applications launched or accessed, files accessed, modified, copied, etc., websites navigated to, online content downloaded and rendered or played, or similar user activities.

Additionally, some embodiments of user-activity monitor 296 extract from the user data information about user activity, which may include current user activity, historical user activity, and/or related information such as contextual information. Alternatively or in addition, in some embodiments, user-activity monitor 296 determines and extracts user-activity contextual information. Such user activity includes user-activity related features, based on an identification of the activity determined by user user-activity monitor 296.) Examples of extracted user activity information may include app usage, online activity, searches, calls, usage duration, application data (e.g., emails, messages, posts, user status, notifications, etc.), or nearly any other data related to user interactions with the user device or user activity via a user device. Among other components of system 200, the extracted user activity information determined by user user-activity monitor 296 may be provided to other components of system 200. Further, the extracted user activity may be stored in a user profile associated with the user, such as in user activity information component 244 of user profile 240. In some embodiments, user user-activity monitor 296 performs conflation on the detected user activity information. For example, overlapping information may be merged and duplicated or redundant information eliminated.

In some embodiments, information received by the user-activity monitor 296 may be used to generate, update, and/or train any of the various data models discussed herein, including a user-interest model and/or a content-relevance model. The functionalities and/or operations of user-activity monitor 296 may be enabled via user activity logic. In some embodiments, user-activity monitor 296 employs user activity event logic, which may include rules, conditions, associations, classification models, or other criteria. The activity event logic can take many different forms depending on the mechanism used to identify an activity event. For example, the user activity event logic could be training data used to train a neural network that is used to evaluate user data to determine when an activity event has occurred. The activity event logic may comprise fuzzy logic, neural network, finite state machine, support vector machine, logistic regression, clustering, or machine-learning techniques, similar statistical classification processes, or combinations of these to identify activity events from user data. For example, activity event logic may specify types of user device interaction(s) information that are associated with an activity event, such as navigating to a website, composing an email, or launching an app. In some embodiments, a series or sequence of user device interactions may be mapped to an activity event, such that the activity event may be detected upon determining that the user data indicates the series or sequence of user interactions has been carried out by the user.

In some embodiments, activity event logic may specify types of user-device related activity that is considered user activity, such as activity that happens while a user is logged into the user device, while user interfaces are receiving input (e.g., while a computer mouse, touchpad, screen, voice-recognition interface, or the like are active), or certain types of activity like launching applications, modifying files with applications, opening a browser and navigating to a website, etc. In this way, the activity event logic may be used to distinguish genuine user activity from automated activity of processes running on the user devices, such as automatic updates or malware scanning. Once a user activity is determined, these features or additional related features may be detected and associated with the detected activity for use in determining activity patterns.

In some embodiments, user user-activity monitor 296 runs on or in association with each user device for a user. User user-activity monitor 296 may include functionality that polls or analyzes aspects of the operating system to determine user activity related features (such as installed or running applications or file accesses and modifications, for example), network communications, and/or other user actions detectable via the user device including sequences of actions.

In some embodiments, such as the embodiment shown in system 200, user user-activity monitor 296 includes sub-components comprising an app activity logging pipeline and a browse activity logging pipeline. These logging pipelines may be embodied as client-side applications or services that run on each user device associated with a user, and in some embodiments may run in conjunction with applications or inside (or as a part of) applications, such as within a browser or as a browser plug-in or extension. App activity logging pipeline, in general, manages logging of a user's application (or app) activity, such as application download, launch, access, use (which may include duration), file access via the application, and in-application user activity (which may include application content). Browse activity logging pipeline, in general, manages logging of a user's browse activity, such as websites visited, social media activity (which may include browse-type activity conducted via specific browsers or apps like the Facebook® app, Twitter® app, Instagram® app, Pinterest® app, etc.), content downloaded, files accessed, and other browse-related user activity. In some embodiments, each browser on a user device is associated with an instance of browse activity logging pipeline, or alternatively a plug-in or service that provided browse information to a single instance of browse activity logging pipeline on the user device. In some embodiments, app and browse activity logging pipelines and may also perform functionality such as logging time stamps, location stamps, user-device related information, or other contextual information that is associated with the logged app activity or browse activity. In some embodiments, app and browse activity logging pipelines and upload logged user activity information to learning engine 270 and/or store the logged activity information in a user profile associated with the user, such as in user activity information component 242 of user profile 240.

An activity pattern inference engine included in user-activity monitor 296 may be generally responsible for determining user-activity patterns based on the user activity information determined from user-activity monitor 296. In some embodiments, the activity pattern inference engine may run on a server, as a distributed application across multiple devices, or in the cloud. At a high level, the activity pattern inference engine may receive user activity-related information, which may be uploaded from user activity logs from client-side applications or services associated with user-activity monitor 296. One or more inference algorithms may be applied to the user activity-related information to determine a set of likely user-activity patterns. For example, patterns may be determined based on similar instances of observation of user activity or associated contextual information, which may be referred to as "in-common features" of user activity-related information. The inferred activity pattern information may be provided to learning engine 270 and/or used to generate, update, and/or train the various data models discussed herein, including a user-interest model and/or a content-relevance model. In some embodiments, a corresponding confidence is also determined for the patterns, as described herein. Further, the activity pattern may comprise a single user activity likely to occur, or a sequence of user actions, or probabilities for more than one future action, for example, an eighty percent likelihood that the next action will be browsing to website A and a fifteen percent likelihood that the next action will be launching a music player application, and a five percent likelihood that the next action will be browsing to website B.

In some embodiments, user-activity patterns may be determined by monitoring one or more activity features, as described previously. These monitored activity features may be determined from the user data described previously as tracked variables or as described in connection to user-data collection component 210. In some cases, the variables can represent context similarities and/or semantic similarities among multiple user actions (activity events). In this way, user-activity patterns may be identified by detecting variables or features in common over multiple user actions. More specifically, features associated with a first user action may be correlated with features of a second user action to determine a likely pattern. An identified feature pattern may become stronger (i.e., more likely or more predictable) the more often the user activity observations that make up the pattern are repeated. Similarly, specific features can become more strongly associated with a user activity pattern as they are repeated.

Example system 200 also includes a presentation component 220 that is generally responsible for presenting the responses to the user and/or to the one or more CSs, as well as notifications of highly-relevant content and the responses to the user. In some embodiments, the presentation component 220 may provide the content that is exchanged in the CS to the user. Presentation component 220 may comprise one or more applications or services on a user device, across multiple user devices, or in the cloud. For example, in one embodiment, presentation component 220 manages the presentation of responses and other CS content to a user across multiple user devices associated with that user. Based on content logic, device features, associated logical hubs, inferred logical location of the user, and/or other user data, presentation component 220 may determine on which user device(s) a responses and other CS content is presented, as well as the context of the presentation, such as how (or in what format and how much of the content, which can be dependent on the user device or context) it is presented, when it is presented, etc. In particular, in some embodiments, presentation component 220 applies content logic to device features, associated logical hubs, inferred logical locations, or sensed user data to determine aspects of content presentation.

In some embodiments, presentation component 220 generates user interface features associated with one or more CSs. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

As described previously, in some embodiments, a virtual assistant service or chat-bot application operating in conjunction with presentation component 220 determines when and how (e.g., presenting when the user is determined to be at a specific logical location) to present the responses and other CS content and/or notifications of real-time content.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes user profiles 240. One example embodiment of a user profile 240 is illustratively provided in FIG. 2. Example user profile 240 includes information associated with a particular user such as information about user accounts and devices 246, user preferences 248, user data models 252, various responses 254, and manually curated responses 258. The information stored in user profile 240 may be available to learning engine 270 or other components of example system 200.

As described previously, user profile 240 may generally include information about user actions or activity events, related contextual information, activity features, or other information determined via user-activity monitor 296, and may include historical or current user activity information. User accounts and devices 246 generally includes information about user devices accessed, used, or otherwise associated with a the user, and/or information related to user accounts associated with the user, for example, online or cloud-based accounts (e.g., email, social media) such as a Microsoft® Net Passport, other accounts such as entertainment or gaming-related accounts (e.g., Xbox Live, Netflix, online game subscription accounts, etc.), user data relating to accounts such as user emails, texts, instant messages, calls, other communications, and other content; social network accounts and data, such as news feeds; online activity; and calendars, appointments, application data, other user accounts, or the like. Some embodiments of user accounts and devices 246 may store information across one or more databases, knowledge graphs, or data structures. As described previously, the information stored in user accounts and devices 246 may be determined from user-data collection component 210 or user-activity monitor 296 (including one of its subcomponents).

User preferences 248 generally include user settings or preferences associated with user activity monitoring. By way of example and not limitation, such settings may include user preferences about specific activities (and related information) that the user desires be explicitly monitored or not monitored or categories of activities to be monitored or not monitored, crowdsourcing preferences, such as whether to use crowdsourced information, or whether the user's activity pattern information may be shared as crowdsourcing data; preferences about which activity pattern consumers may consume the user's activity pattern information; and thresholds, and/or notification preferences, as described herein Turning to FIG. 3, a flow diagram is provided illustrating one example method 300 for providing enhanced communication session services in accordance with an embodiment of the present disclosure. Each block or step of method 300 and other methods described herein comprises a computing process that may be performed using any combination of hardware, firmware, middleware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Accordingly, method 300 may be performed by one or more computing devices, such as a smartphone, a virtual assistant (VA) device, chat-bot device, intelligent agent (IA) device, or other user device, a server, or by a distributed computing platform, such as in the cloud. The activity pattern may be inferred through the analysis of signal data (or user data) gathered from one or more user devices associated with the user.

Embodiments of block or step 302 may monitor user activity of a user participating in one or more communication sessions (CSs). In some embodiments, the user may employ any of devices 102-102n of FIG. 1 to participate in the one or more CSs. The user may be exchanging content with other users participating in the one or more CSs, wherein the other users are employing other devices to participate in the one or more CSs. The content may include one or more natural language expressions and/or utterances that encode a conversation carried out by the user and the other users. A user-activity monitor, such as but not limited to user-activity monitor 296 of FIG. 2 may be employed to monitor the user activity of the user, including participating in the one or more CSs. As discussed in the various embodiments, monitoring the user activity of the user may include determining, identifying, and/or inferring one or more user-activity patterns of the user.

At step 304, a user-interest model for the user may be generated based on the monitored user activity. For instance, in some embodiments, a user-interest model may be generated, updated, and/or trained based on the inferred one or more user-activity patterns of the users, and/or various other information, such as but not limited to information included in user profile 240 of FIG. 2. In one embodiment, one or more components of a learning engine, such as but not limited to learning engine 270 of FIG. 2, may generate the user-interest model. For instance, user-interest model learner 268 of FIG. 2 may train the user-interest model based on the monitored user activity.

In some embodiments, the user-interest model may be updated at block 304 based on user feedback. Such user feedback may include curated versions of the automatically generated responses. The curated versions of the automatically generated responses may be curated (or edited) by the user that is speaking the responses, or by one or more other users that are receiving the response as part of the conversation. User feedback may also include edited and/or curated representations of any of the various data models discussed herein. For instance, the user may be provided with a representation of a data model. The user may hand curate or edit the representation. The data model may be updated to incorporate or reflect the user's curations. In a non-limiting example, a visual representation of the user-interest model may be provided to the user, and the user may manually curate and/or edit the representation. The user-interest model is updated based on the edits to the representation. For instance, the user may be provided with a topic graph, topic map, or hierarchical list of topics that are included in the user-interest model. The user may manually edit such visual representations of the user-interest model.

At step 306, various data models, such as a content-relevance model, content-substance model, and content-style model, are generated and/or updated based on the user-interest model, the monitored user activity, and/or the user feedback. For instance, in some embodiments, a content-relevance model may be generated, updated, and/or trained based on the generated user-interest model, the inferred one or more user-activity patterns of the users, and/or other information, such as but not limited to information included in user profile 240. The content-substance, content-style, CS context, and response-generation models may be generated based on CS content employed as training data. In one embodiment, one or more components of a learning engine, such as but not limited to learning engine 270, may generate and/or update the various data models. For instance, content-relevance model learner 278 may train the content-relevance model based on the user-interest model, as well as information culled from user profile 240. On or more knowledge maps or concepts maps may be employed to generate the content-relevance models. A concept map may indicate relationships between various concepts and ideas. For instance, a knowledge map or a concept map may be queried based on the results of NLP processing of CS content included in a training data set. More specifically, a concept map may be queried to determine ideas that are in relationships to concepts (embedded in to conversation) that are determined via a NLP analysis of the training content or vice versa. A knowledge graph provides a mapping between semantic knowledge and people, places, and things. Similar to the case of a concept map, a knowledge graph may be queried to pair and/or associate semantic knowledge with topics or concepts discussed in the conversation embedded in the training content.

Similarly, content-substance model learner 272 may generate, update, and/or train the content-substance model. Content-style model learner 274 may generate, update, and/or train the content-style mode. CS context model learner 278 may generate, update, and/or train the CS context model. Response-generation model learner 288 may generate, update, and/or train the response-generation model.

At step 308, the one or more CSs are monitored. Various embodiments for monitoring a CS are discussed in conjunction with process 400 of FIG. 4. However, briefly here, monitoring a CS may include receiving at least a portion of the content that is exchanged by a plurality of users participating in the CS. Monitoring a CS may also include receiving other data or information associated with the CS, such as but not limited to metadata of the CS. Some of the other received data may be associated with a context of the CS for the user. A CS monitor, such as but not limited to CS monitor and analyzer 290 of FIG. 2 may monitor the one or more CSs.

At step 310, the content and/or the context of the one or more CSs are analyzed. The content and context of the one or more CSs may be analyzed based on the content-substance model, the content-style-model, and the CS context model. Various embodiments for analyzing the content and the context of a CS are discussed in conjunction with process 400 of FIG. 4. However, briefly here, analyzing the content of a CS may include determining one or more content features, such as but not limited to content-substance and content-style features. Such content features may indicate a portion of the intended semantics of the natural language expressions and/or utterances included in the content. A CS analyzer, such as but not limited to CS monitor and analyzer 290 may be employed to analyze at least one of the content and/or the context of the CS. For instance, content-substance and content-style features may be determined via CS-content analyzer 292. Contextual features of the monitored CS may be determined at block 310 via CS-context analyzer 294.

At step 312, content to respond to is identified based on the content-relevance model and the CS context model. More specifically, content that is likely-relevant to respond to is identified at step 312. Portions of the analyzed content that are likely-relevant to the user, for a response, are identified based on the content-relevance model. Various embodiments of identifying likely-relevant content are discussed in conjunction with process 500 of FIG. 5. However, briefly here, based on the analyzed content and context of the CS, various portions of the content may be identified as likely-relevant to the user, or even highly-relevant to the user. When content is identified as highly relevant to the user, one or more real-time (or near real-time) notifications of the highly-relevant content may be provided to the user. A content relevance engine, such as but not limited to content relevance determiner 280 of FIG. 2 may enable providing the notification to the user.

At step 314, one or more responses to the content as identified as likely-relevant are provided. Various embodiments of providing a response to likely-relevant content are discussed in conjunction with process 500 of FIG. 5. However, briefly here, the response-generation model may be employed to generate at least one response or portion of a response. In a semi-autonomous mode, the one or more responses may be provided to the user. In one embodiment, various alternative response are provided to the user and the user may choose which of the alternative responses to provide to the CS. In an autonomous mode, the one or more responses may be provided directly to the CS. A response engine, such as but not limited to response engine 260 of FIG. 2 generate and provide the responses. Alternatively, a presentation component, such as but not limited to presentation component of FIG. 2, may provide the response to the user or to the CS.

At block 316, feedback from the user is received. Such user feedback may include curated and/or edited response, a user selection or choice between multiple provided alternative responses, and the like. As noted, the feedback may be curated and/or provided by the user that is speaking the automatically generated response. Alternatively, or in addition to, the feedback may be generated, curated, or edited by other users, such as the other users participating in the CS who are intended recipients of the automatically generated responses. Process 300 returns to block so that the various data models may be updated based on the received user feedback.

Figure 3:
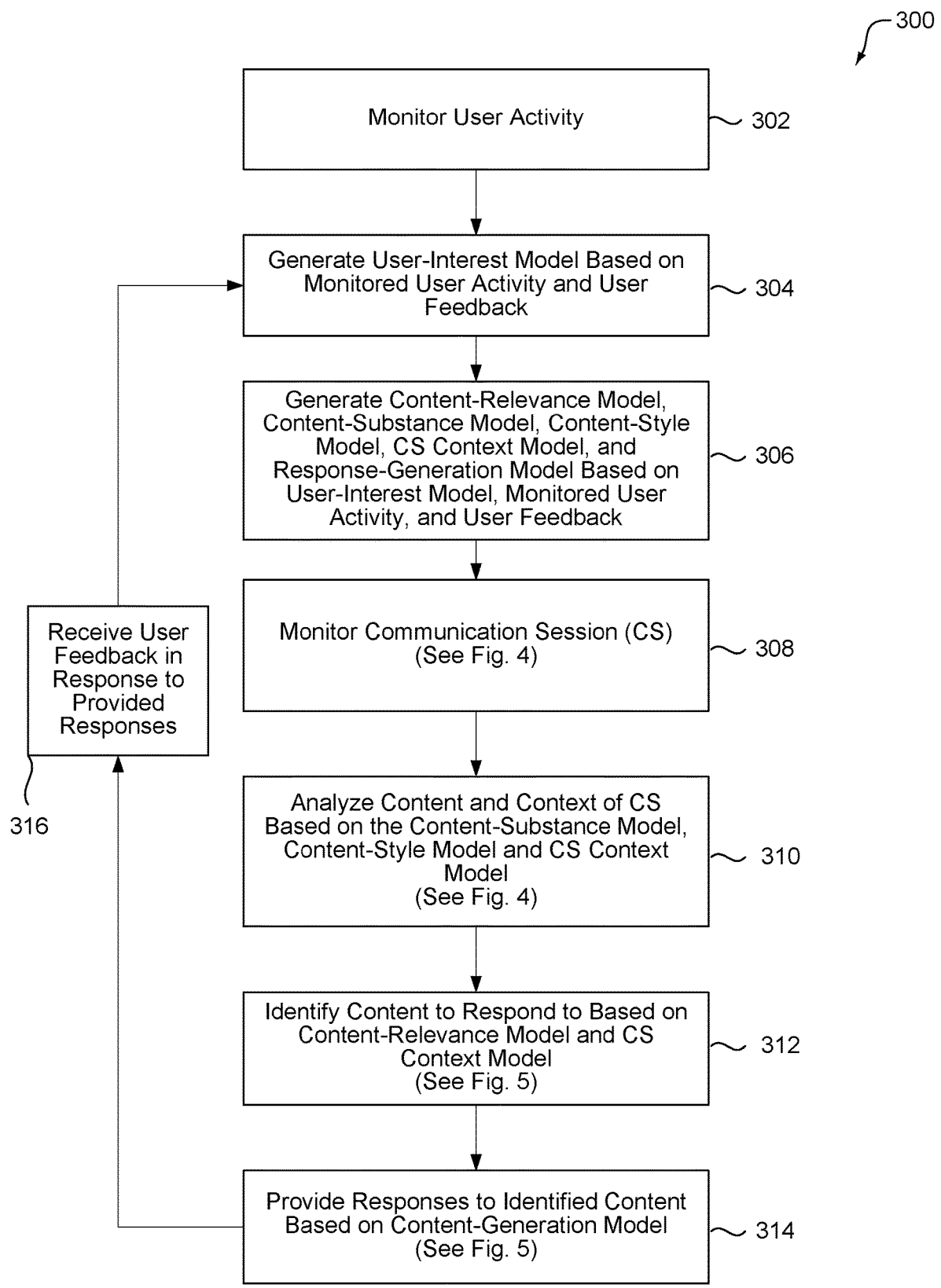
FIG. 3 depicts a flow diagram of a method for providing enhanced communication session services in accordance with an embodiment of the present disclosure.
Figure 4:
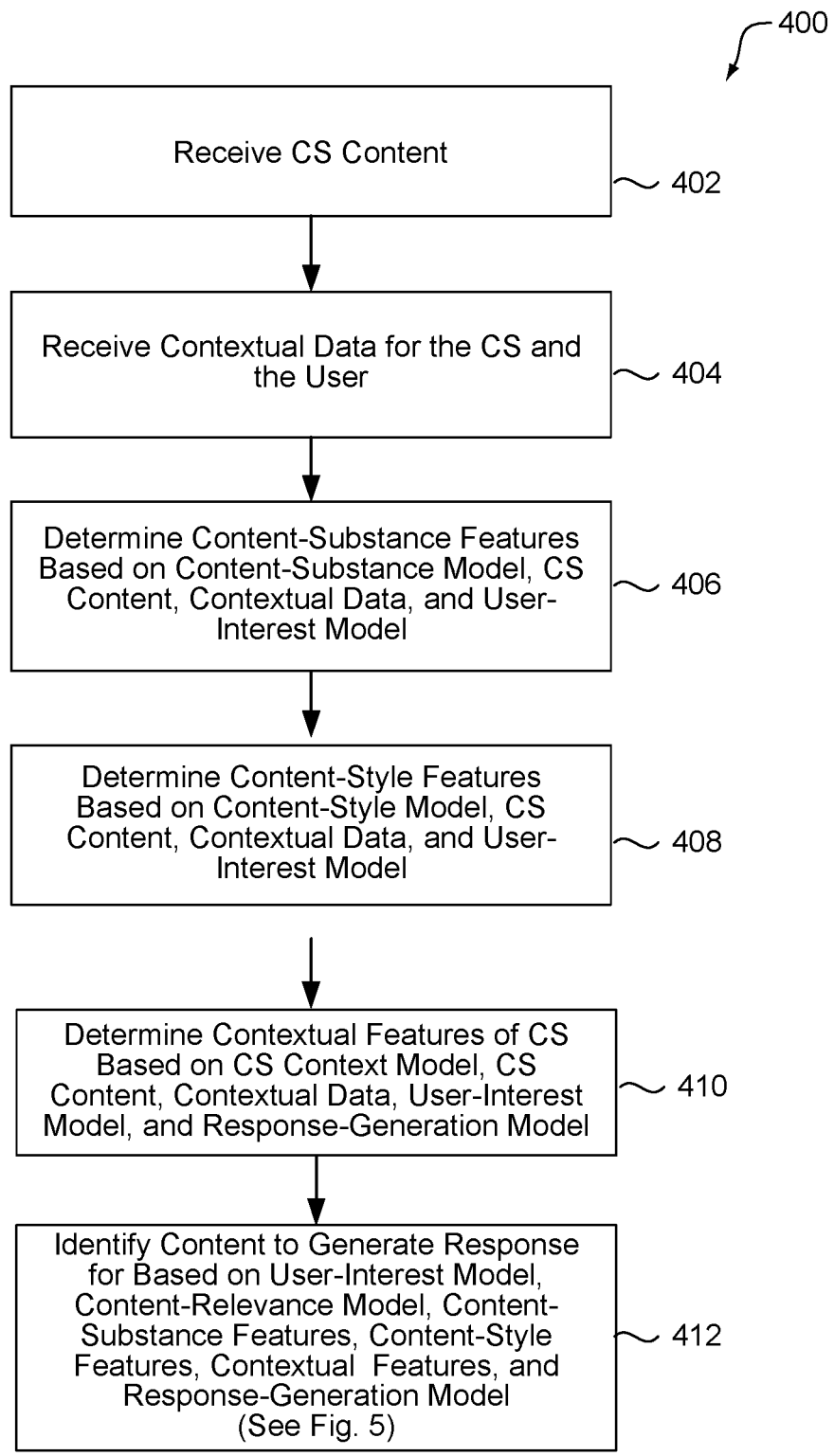
FIG. 4 depicts a flow diagram of a method for identifying content of the communication session of FIG. 3 that is likely-relevant to provide a response for, in accordance with an embodiment of the present disclosure.

FIG. 4 depicts a flow diagram of a method for identifying content of the communication session of FIG. 3 that is likely-relevant to provide a response for, in accordance with an embodiment of the present disclosure. At step 402, the content of the CS is received. For instance, the content may be received by a CS monitor, such as but not limited to CS monitor and analyzer 290 of FIG. 2. At step 404, contextual data for the CS is received. The contextual data may include contextual data for the user. Such contextual data may include other data associated with the CS, such as but not limited to metadata of the CS. That is, at least a portion of the other data may be associated with the context of the CS and the context of the CS for the user. The contextual data, including the metadata, may be received by the same or a separate CS monitor that received the content at step 402.

At step 406, one or more content-substance features of the received content are determined and/or identified. Determining the content-substance features may be based on the content, a content-substance model, and the contextual data of the CS. A content-substance model learner, such as but not limited to content-substance model learner 272 of FIG. 2 may generate, update, and/or train the content-substance model. The content-substance features may additionally be based on the user-interest model trained by a learning engine. Determining the content-substance features may include determining one or more content-substance features for at least a portion of the content lines (or blocks of content lines) of the content.

As noted throughout, the content-substance features of content may encode or indicate the conceptual or semantic components of the content. That is, the content-substance feature may indicate the semantics, meanings, and/or intensions associated with the content. A content-substance feature may indicate one or more topics and/or keywords associated with the content line. A content-substance feature may also indicate a sentiment of the speaker. That is, a sentiment content-substance feature may encode an identified and/or categorized opinion expressed in the content. As CS-content analyzer, such as but not limited to CS-content analyzer 292 may determine and/or identify the one or more content-substance features. A content-substance feature may be an observable, latent, or hidden feature or variable of the substance of the content.

At step 408, one or more content-style features of the received content are determined and/or identified. Determining the content-style features may be based on the content, a content-style model, and the other data associated with the CS. A content-style model learner, such as but not limited to content-style model learner 274 of FIG. 2 may generate, update, and/or train the content-style model. The user-interest model may be employed to determine the content-style features. Determining the content-style features may include determining one or more content-style features for at least a portion of the content lines (or blocks of content lines) of the content.

The content-style features of content may encode or represent the stylistic (e.g., grammatical) choices of the speaker of the content line. That is, content-style features may indicate grammar, vocabulary, emotive, and dialogue choices of the speaker. For instance, content-style features may encode the speaking style of the speaker. Content-style features may additionally encode one or more emotions of the speaker, e.g., anger, surprise, satisfaction, happiness, and other emotions. Content-style features may indicate the intonation, speed, and volume of the speaker. CS-content analyzer 292 may determine and/or identify the one or more content-substance features. A content-style feature may be an observable, latent, or hidden feature or variable of the style of the content.

At step 410, one or more contextual features of the CS are determined and/or identified. Determining the contextual features may be based on the content, a CS context model, and the contextual data, such as the other data associated with the CS, which may include the received metadata. A CS context model learner, such as but not limited to CS context model learner 278 of FIG. 2 may generate, update, and/or train the CS context model. The user-interest model may be employed to determine the contextual features. A contextual feature may be an observable, latent, or hidden feature or variable of the context of the CS. A CS-context analyzer, such as but not limited to CS-context analyzer 294 of FIG. 2 may be employed to determine the one or more contextual features of the CS.

Contextual features of a CS may include, but are not otherwise limited to an indication or encoding of each of the users participating in and/or associated with the CS, an activity and/or engagement level of each of the associated users, and an availability of each of the associated users. Contextual features may additionally indicate initiating and terminating timestamps of the CS, the temporal duration of the CS, and an indication of other past or current CSs that the associated users have or are currently participating in. Additional contextual features may indicate an approximate geo-location and/or logical location of each associated users. A CS contextual feature may include or be based on any user profile information for each of the associated users.

A contextual feature for a CS may indicate or encode a hierarchical relational graph that indicates one or more relationships between at least some of the pairs of associated users of the CS. An indicated relationship may include a professional, personal, or genetic relationship. For instance, the relational graph may indicate a manager/subordinate relationship, a spousal/personal partnership relationship, a parent/child/sibling relationship, or any other such relationship for pairs of associated users. A contextual feature may indicate one or more social network graphs based on and/or generated from one or more social network platforms that the users employ. A contextual feature may include an indication, such as but not limited to a static or dynamic link, for materials referenced and/or exchanged in the conversation, such as emails, websites, slide decks, spreadsheets, files, or other such documents, including any multimedia content. Such multimedia content may include electronic books (e-books), audio and/or video files, animations, organization charts, or other such audible, visual, and/or textual content.

A contextual feature may encode or more contextual tags. For instance, a "social" tag may be encoded in a contextual feature for a CS that is directed towards a social conversation or interaction, whereas "work" and/or "meeting" tags may be CS contextual feature of a CS that is directed towards a work-related meeting. Contextual features may indicate or encode meeting titles, meeting subjects, meeting agendas, meeting schedules, or other such information indicating the structure and/or topics of a conversation of the CS. A contextual feature may indicate one or more privacy and/or encryption configurations of the CS. A contextual feature for a CS may encode virtually any determinable information that is indicative of a context of the CS.

A contextual feature may encode a "role" or "position" for at least a portion of the users within the CS. For instance, a contextual feature may encode whether a particular user is a "leader," "participant," or an "observer" within the CS. The context of the CS for each user may be based on their role or position within the CS. Thus, the identification of likely-relevant content and the generation of a response to the of the likely-content, for a particular user, may be based on their role or position within the CS, as well as the role or position of each of the other users At step 412, content is identified for which to generate a response for. That is, content that is likely-relevant to generate a response for is identified. Identifying such content may be based on the user-interest model, the content-relevance model, the one or more content-substance features, the one or more content-style features, the one or more contextual features, and the response generation model. Identifying likely-relevant content to response to includes determining a relevance of the content. Such a relevant may be based on the user-interest model, the content-relevance model, the one or more content-substance features, the one or more content-style features, and/or the one or more contextual features. A content relevance engine, such as but not limited to content relevance determiner 280 of FIG. 2 may be employed to determine the relevance of the content. In at least one embodiments, content relevance analyzer 282 of FIG. 2 is employed to determine the relevance of the content.

Figure 5:
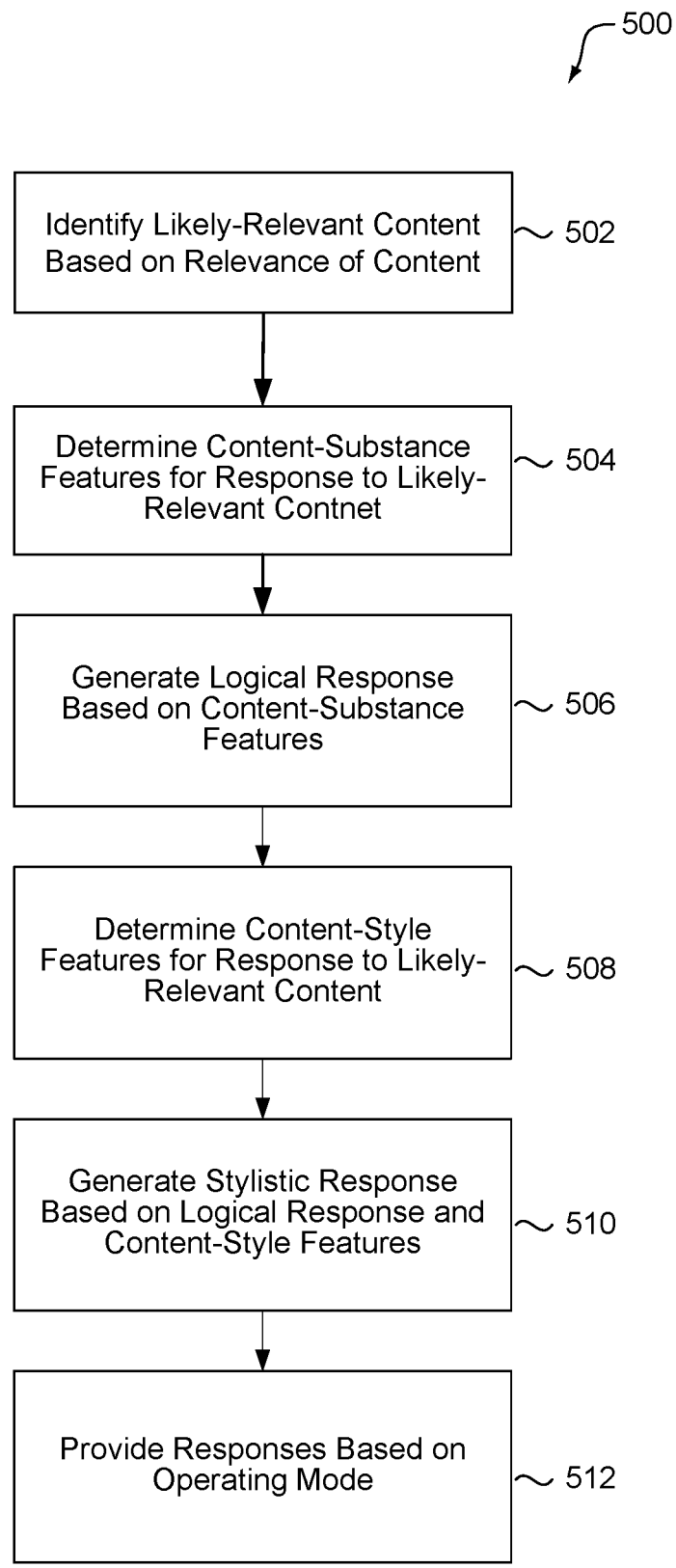
FIG. 5 depicts a flow diagram of a method for generating and providing a response to content of the communication session of FIG. 3, in accordance with an embodiment of the present disclosure.

Various embodiments for identifying content to response to are discussed in conjunction with at least process 500 of FIG. 5. However, briefly here, identifying content to respond to includes determining the relevance of the content includes determining one or more probabilities, wherein the one or more probabilities correlate with the likelihood that the content is relevant to the user. The one or more probabilities may be structured as a normalized scalar, vector, a matrix, a tensor, or some of the data structure such as a multidimensional array. Each component of the data structure indicates a probability that the content is relevant to the use, with respect to one or more of the user's interests. In some embodiments, a component of the determined content relevance may indicate a temporal urgency of the content. That is, the component may indicate that the content is of an urgent nature and should be brought to the user's interests very soon. In one embodiment, a relevance for content includes an overall relevance that is a combination of the one or more probabilities corresponding to the various topics of interest to the user.

FIG. 5 depicts a flow diagram of a method for generating and providing a response to content of the communication session of FIG. 3, in accordance with an embodiment of the present disclosure. At step 502, one or more portions of the content that is likely-relevant to user are identified based on the relevance of the content. A content identifier, such as but not limited to content identifier 284 of FIG. 2 may be employed to identify the likely-relevant content.

Identifying the likely-relevant content may be based one or more relevance thresholds. That is, content may be identified as likely-relevant if one or more of the relevant probabilities or scores is greater than a relevance threshold. In one embodiment, the content may be identified as likely-relevant if the overall relevance is greater than an overall relevance threshold. In some embodiments, the content may be identified as likely-relevant if the probability corresponding to the temporal urgency is greater than an urgency threshold. One or more relevance thresholds may be provided by the user via user preferences 248 and/or other information included in user profile 240 of FIG. 2.

In other embodiments, the likely-relevant content may be identified based on other methods. In one embodiment, determining the likely-relevant content may be based on ML methodologies. For instance, the user may manually curate automatically generated responses and/or provide manually generated responses. The curated and/or manually generated responses may be stored in user curated responses 258 of FIG. 2 and may serve as "ground-truth" responses. Various ML methodologies may learn data models to learn to identify the likely-relevant content. In one embodiment, using manually curated CS responses as "ground-truth" responses enables the automatic determination of one or more relevance thresholds.

At step 502, highly-relevant content may also be identified based on the identified likely-relevant content the relevance of the content and additional relevance threshold. The highly-relevant content may be identified by a content identifier, such as but not limited to content identifier 284. The highly-relevant content may be identified based on a relevant threshold that is greater than the relevant thresholds employed to identify the likely-relevant content. That is, content may be identified as highly-relevant if one or more of the relevant probabilities or scores is greater than a highly-relevant threshold. For instance, an urgency threshold may be employed to identify the highly-relevant content. A summary of the identified likely-relevant or highly-relevant content may be generated at block 502. For instance, content summary generator 286 may generate a summary of the content. The summary may be provided to the user. The summary of the likely-relevant content may be employed to generate the response to the likely-relevant content.

At block 504, one or more content-substance features to encode in a response to the likely-relevant and/or highly-relevant content are determined based on the response-generation model. A logical response generator, such as logical response generator 262 of FIG. 2 may determine the content-substance features to encode in the response. More specifically, determining the content-substance features to include in a response may be based on the content-substance features, and the content-style features encoded in the likely-relevant content, as well as the contextual features of the CS. The response-generation model may employ the content-substance model to determine the content-substance features to include in the response. At block 506, the logical response is generated based on the content-substance features determined at block 504. The logical response generator may employ the response-generator model, as well as other NLP models, to generate the logical response that encodes the content-substance features. The logical response may be generated based on a summary of the likely-relevant content, such as the summary generated by content summary generator 286 of FIG. 2.

At block 508, one or more content-style features to encode in a response to the likely-relevant and/or highly-relevant content are determined based on the response-generation model. The logical response generator may determine the content-style features to encode in the response. More specifically, determining the content-style features to include in a response may be based on the content-substance features and the content-style features encoded in the likely-relevant content, as the as the contextual features of the CS. The response-generation model may employ the content-substance model and the content-style model to determine the content-style features to include in the response. At block 510, the stylistic response is generated based on the logical response generated at block 506, the content-substance features determined at block 504, and the content-style features determined at block 508. The logical response generator may employ the response-generator model to generate the stylistic response that encodes the content-substance and the content-style features. The stylistic response may be generated based on a summary of the likely-relevant content, such as the summary generated by a content summary generator.

At block 512, the stylistic responses and/or the logical responses are provided based on the operating mode. A response presenter, such as but not limited to response presenter 266 of FIG. 2, may be employed to provide the responses based on the operating mode. In an autonomous mode, the stylistic response may be provided directly to the corresponding CS. In a semi-autonomous mode, the stylistic response may be provided to the user. The user may decide whether to provide the response to the CS, edit the response prior to providing the response to the CS, or provide a manually created response to the CS. In some embodiments, the logical response may be provided to the user. The user may manually create a stylistic response to provide to the CS based on the provided logical response. In some embodiments, multiple alternative logical and/or stylistic responses may be provided to the user. The user may manually select which of the alternative responses to provide to the CS. The selection of the alternative responses may be employed as user feedback to update the various data models discussed herein.

At block 512, the responses may be provided to the CS or the user in a textual or audible format. In some embodiments, the text of the responses is provided in a window hosting the CS. In other embodiments, the text of the responses is provided in another window such that the user may edit and copy and paste the text into the window hosting the CS. In some embodiments, text-to-audio services are employed to automatically generate a spoken version of the stylistic response. In some embodiments, ML methodologies are employed to automatically generate spoken versions of the stylistic responses that emulate the voice of the user. That is, audible versions of the stylistic response may be generated that sound similar to as if the user spoke the stylistic responses. When operated in an autonomous mode, such audible versions of the responses may be provided directly to the CS, such that the other users participating in the CS may be under the impression that the user spoke such an automatically generated stylistic response.

In some embodiments, at step 512, a notification for the highly-relevant content and the corresponding generated responses may be provided to the user. The response presenter may be employed to provide the user a real-time notification of the highly-relevant content and the generated responses. For example, for content that is identified as highly-relevant to the user at block 502, the various embodiments may provide, real-time and/or near real-time, audible and/or visual notifications or prompts to call the user's attention to the content and the generated responses. For instance, as discussed herein, the determined relevance may include a determined temporal urgency of the content. When a user is simultaneously participating in multiple CSs distributed across multiple windows or user-interfaces, the various embodiments may highlight or position the user-interface that includes identified highly-urgent content and the generated responses in the foreground of the user's display device. The user's attention may further be directed to the highly-urgent content and responses with additional selective-highlighting within the user-interface that is now in the display device's foreground. Thus, in addition to automatically generating and providing responses to likely-relevant content, the enhanced CS services provided by the various embodiments include identifying and highlighting CS content that is highly-relevant to the user as well as the generated responses, where the identification of highly-relevant content and the generation of the responses is targeted to the specific user. In one embodiment, the notification to highlight highly-relevant content and responses may be provided via automatically generated speech. The speech-based notification may include the highly-relevant content, a summarized version of the highly-relevant content, or simply a spoken, or otherwise audible, indication to direct the user's attention to a specific user-interface, as well as the generated responses.

In some embodiments, a cloud system and/or a cloud service may be utilized to perform portions of methods 300, 400, and 500 so as to provide an improved or enhanced user experience (such as automatically generated responses for one or more CSs) to multiple services, which may be running on many different user devices.

Figure 6:
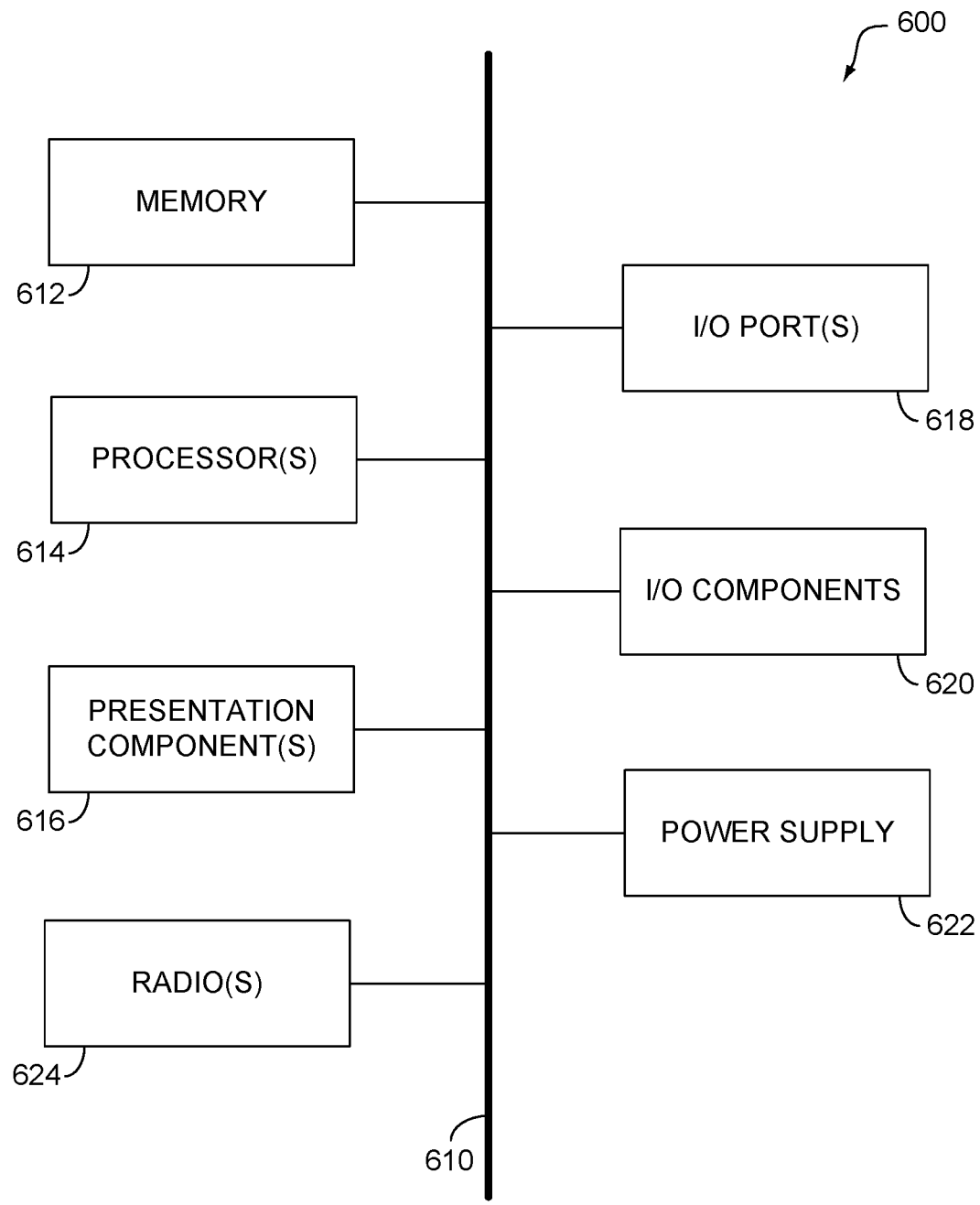
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O (I/O) components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. In some implementations, presentation component 220 of system 200 may be embodied as a presentation component 616. Other examples of presentation components may include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system comprising:
   one or more processors; and
   computer storage memory having computer-executable instructions stored thereon which, when executed by the one or more processors, implement a method comprising:
   receiving content that is exchanged within a communication session (CS), wherein the content includes one or more natural language expressions that encode a portion of a conversation carried out by a plurality of users participating in the CS, wherein the content is associated with a relevance threshold for identifying one or more likely portions of the content and an additional relevance threshold for identifying a highly relevant portion of the one or more portions of the content;
   determining a relevance of the content based on a content-relevance model for the first user;
   identifying one or more likely-relevant portions of the content based on the relevance of the content, wherein the one or more identified likely-relevant portions of the content are likely-relevant to the first user;
   identifying the highly relevant portion from a sub-portion of the one or more likely-relevant portions of the content based on both the relevance threshold and the additional relevance threshold, wherein the sub-portion is associated with the additional relevance threshold that is greater than the relevance threshold; and
   generating a notification associated with the one or more identified likely-relevant portions of the content and the highly relevant portion of the content.

2. The system of claim 1, wherein the method further comprises:
- determining one or more content features based on the content and one or more natural language models, wherein the one or more content features indicate one or more intended semantics of the one or more natural language expressions;
- determining the relevance of the content further based on the content features; and
- generating a response to the one or more likely-relevant portions further based on the one or more content features.

3. The system of claim 1, wherein the method further comprises:
- receiving metadata associated with the CS;
- determining one or more contextual features of the CS based on the received metadata and a CS context model, wherein the one or more contextual features indicate a context of the conversation for the first user; and
- generating a response to the one or more likely-relevant portions of the content further based on the one or more contextual features of the CS.

4. The system of claim 1, wherein the method further comprises:
- generating a response to the one or more likely-relevant portions of the content based on a response-generation model for the first user,
- wherein when the system is operated in a semi-autonomous mode, providing the response to the one or more likely-relevant portions of the content to the first user; and when the system is operated in an autonomous mode, providing the response to the one or more likely-relevant portions of the content to the CS;
- receiving user feedback based on the response to the one or more likely-relevant portions of the content; and
- updating the response-generation model based on the user feedback.

5. The system of claim 4, wherein the method further comprises:
- determining one or more content-substance features based on the content and a content-substance model included in the one or more natural language models, wherein the one or more content-substance features indicate one or more topics discussed in the conversation; and
- determining one or more content-style features based on the content and a content-style model included in the one or more natural language models, wherein the one or more content-style features indicate an emotion of at least one of the plurality of users; and
- generating a response to the one or more likely-relevant portions of the content further based on the one or more content-substance features and the one or more content-style features of the content.

6. The system of claim 1, wherein the method further comprises:
- determining one or more content-substance features to encode in the response based on other content-substance features encoded in the likely-relevant portions of the content;
- determining one or more content-style features to encode in the response based on other content-style features encoded in the likely-relevant portions of the content; and
- generating a response to the one or more likely-relevant portions of the content such that the response encodes the one or more content-substance features and the one or more content-style features.

7. The system of claim 1, wherein the method further comprises:
- generating a response to the highly-relevant portion of the content based on the response-generation model for the first user; and
- providing the notification of the identified highly-relevant portion of the content and the response to the highly-relevant portion of the content to the first user.

8. A method comprising:
- receiving content that is exchanged within a communication session (CS), wherein the content includes one or more natural language expressions that encode a portion of a conversation carried out by a plurality of users participating in the CS, wherein the content is associated with a relevance threshold for identifying one or more likely portions of the content and an additional relevance threshold for identifying a highly relevant portion of the one or more portions of the content;
- determining a relevance of the content based on a content-relevance model for the first user;
- identifying one or more likely-relevant portions of the content based on the relevance of the content, wherein the one or more identified likely-relevant portions of the content are likely-relevant to the first user;
- identifying the highly relevant portion from a sub-portion of the one or more likely-relevant portions of the content based on both the relevance threshold and the additional relevance threshold, wherein the sub-portion is associated with the additional relevance threshold that is greater than the relevance threshold; and
- generating a notification associated with the one or more identified likely-relevant portions of the content and the highly relevant portion of the content.

9. The method of claim 8, further comprising:
- determining one or more content features based on the content and one or more natural language models, wherein the one or more content features indicate one or more intended semantics of the one or more natural language expressions;
- determining the relevance of the content further based on the content features; and
- generating a response to the one or more likely-relevant portions further based on the one or more content features.

10. The method of claim 8, further comprising:
- receiving metadata associated with the CS;
- determining one or more contextual features of the CS based on the received metadata and a CS context model, wherein the one or more contextual features indicate a context of the conversation for the first user; and
- generating a response to the one or more likely-relevant portions of the content further based on the one or more contextual features of the CS.

11. The method of claim 8, further comprising:
- generating a response to the highly-relevant portion of the content based the response-generation model for the first user; and
- providing a real-time notification of the identified highly-relevant portion of the content and the response to the highly-relevant portion of the content to the first user.

12. The method of claim 8, further comprising:
- determining one or more content-substance features based on the content and a content-substance model included in the one or more natural language models, wherein the one or more content-substance features indicate one or more topics discussed in the conversation; and determining one or more content-style features based on the content and a content-style model included in the one or more natural language models, wherein the one or more content-style features indicate an emotion of at least one of the plurality of the users; and generating a response to the one or more likely-relevant portions of the content further based on the one or more content-substance features and the one or more content-style features of the content.

13. The method of claim 12, further comprising:

receiving user feedback based on the response to the one or more likely-relevant portions of the content; and updating at least one of the response-generation model, the content-substance model, or the content-style model based on the user feedback.

14. The method of claim 8, further comprising:

generating a response to the one or more likely-relevant portions of the content based on a response-generation model for the first user, when operated in a semi-autonomous mode, providing the response to the one or more likely-relevant portions of the content to the first user; and when operated in an autonomous mode, providing the response to the one or more likely-relevant portions of the content to the CS.

15. One or more computer-readable media having instructions stored thereon, wherein the instructions, when executed by a processor of a computing device, cause the computing device to perform actions including:

receiving content that is exchanged within a communication session (CS), wherein the content includes one or more natural language expressions that encode a portion of a conversation carried out by a plurality of users participating in the CS, wherein the content is associated with a relevance threshold for identifying one or more likely portions of the content and an additional relevance threshold for identifying a highly relevant portion of the one or more portions of the content;

determining a relevance of the content based on a content-relevance model for the first user;

identifying one or more likely-relevant portions of the content based on the relevance of the content, wherein the one or more identified likely-relevant portions of the content are likely-relevant to the first user;

identifying the highly relevant portion from a sub-portion of the one or more likely-relevant portions of the content based on both the relevance threshold and the additional relevance threshold, wherein the sub-portion is associated with the additional relevance threshold that is greater than the relevance threshold; and generating a notification associated with the one or more identified likely-relevant portions of the content and the highly relevant portion of the content.

16. The media of claim 15, the actions further comprising:

receiving metadata associated with the CS;

determining one or more contextual features of the CS based on the received metadata and a CS context model, wherein the one or more contextual features indicate a context of the conversation for the first user; and generating a response to the one or more likely-relevant portions of the content further based on the one or more contextual features of the CS.

17. The media of claim 15, wherein the actions further comprise:

generating a response to the highly-relevant portion of the content based the response-generation model for the first user; and providing the notification of the identified highly-relevant portion of the content and the response to the highly-relevant portion of the content to the first user.

18. The media of claim 15, wherein the actions further comprise:

determining one or more content-substance features based on the content and a content-substance model included in the one or more natural language models, wherein the one or more content-substance features indicate one or more topics discussed in the conversation; and determining one or more content-style features based on the content and a content-style model included in the one or more natural language models, wherein the one or more content-style features indicate an emotion of at least one of the plurality of the users; and generating a response to the one or more likely-relevant portions of the content further based on the one or more content-substance features and the one or more content-style features of the content.

19. The media of claim 15, wherein the actions further comprise:

determining one or more content-substance features to encode in a response based on other content-substance features encoded in the likely-relevant portions of the content;

determining one or more content-style features to encode in the response based on other content-style features encoded in the likely-relevant portions of the content; and generating the response to the one or more likely-relevant portions of the content such that the response encodes the one or more content-substance features and the one or more content-style features.

20. The actions of claim 15, wherein the actions further comprise:

generating a response to the one or more likely-relevant portions of the content based on a response-generation model for the first user, providing the response to the one more likely-relevant portions of the content to one or more other users that are separate from the first user and participating in the CS;

receiving user feedback, from at least one of the one or more other users, based on the response to the one or more likely-relevant portions of the content; and updating the response-generation model based on the user feedback received from the at least one of the one or more other users.

* * * * *